United States Patent
Imai

(10) Patent No.: US 11,987,286 B2
(45) Date of Patent: May 21, 2024

(54) VEHICLE AUTOMATIC PARKING CONTROL DEVICE

(71) Applicant: Clarion Co., Ltd., Saitama (JP)

(72) Inventor: Masato Imai, Tokyo (JP)

(73) Assignee: Clarion Co., Ltd, Saitama (JP)

( * ) Notice: Subject to any disclaimer, the term of this patent is extended or adjusted under 35 U.S.C. 154(b) by 85 days.

(21) Appl. No.: 16/743,086

(22) Filed: Jan. 15, 2020

(65) Prior Publication Data

US 2020/0148263 A1   May 14, 2020

Related U.S. Application Data

(62) Division of application No. 15/557,191, filed as application No. PCT/JP2016/057120 on Mar. 8, 2016, now abandoned.

(30) Foreign Application Priority Data

Mar. 27, 2015   (JP) .................................. 2015-066363

(51) Int. Cl.
*B62D 15/02*     (2006.01)
*B60W 30/06*     (2006.01)
(Continued)

(52) U.S. Cl.
CPC ......... *B62D 15/0285* (2013.01); *B60W 30/06* (2013.01); *B60W 30/08* (2013.01);
(Continued)

(58) Field of Classification Search
None
See application file for complete search history.

(56) References Cited

U.S. PATENT DOCUMENTS

2003/0210157 A1\* 11/2003 Gotzig .............. B60W 30/1819
340/932.2
2015/0032293 A1\* 1/2015 O'Neill ............... B60W 50/029
701/2
(Continued)

FOREIGN PATENT DOCUMENTS

DE   10 2008 019 346 A1   9/2009
DE   10 2010 038 966 A1   2/2012
(Continued)

OTHER PUBLICATIONS

International Search Report (PCT/ISA/210) issued in PCT Application No. PCT/JP2016/057120 dated May 24, 2016 with English translation (Three (3) pages).
(Continued)

*Primary Examiner* — Christian Chace
*Assistant Examiner* — Katherine Marie Fitzharris
(74) *Attorney, Agent, or Firm* — Crowell & Moring LLP

(57) ABSTRACT

This vehicle control device is provided with: an environment recognition unit for recognizing the surrounding environment of a vehicle; a parking route generation unit for generating a travel route to a parking position which is determined on the basis of the recognized surrounding environment; a signal input unit to which a parking command signal is input; and a travel control unit for causing the vehicle to travel along the travel route to the parking position on the basis of the input parking command signal. The vehicle control device drives the vehicle to travel to the
(Continued)

parking position for automatic parking while behaving differently depending on whether the parking command signal input to the signal input unit is a first parking command signal or a second parking command signal.

8 Claims, 25 Drawing Sheets

(51) Int. Cl.
    *B60W 30/08*     (2012.01)
    *B60W 30/09*     (2012.01)
    *B60W 30/095*     (2012.01)
    *G05D 1/00*     (2006.01)
    *G06V 20/58*     (2022.01)
    *G08G 1/0962*     (2006.01)
    *G08G 1/14*     (2006.01)
    *G08G 1/16*     (2006.01)

(52) U.S. Cl.
    CPC .......... *B60W 30/09* (2013.01); *B60W 30/095* (2013.01); *G05D 1/0055* (2013.01); *G05D 1/0088* (2013.01); *G05D 1/0246* (2013.01); *G06V 20/58* (2022.01); *G06V 20/586* (2022.01); *G08G 1/0962* (2013.01); *G08G 1/143* (2013.01); *G08G 1/168* (2013.01)

(56) References Cited

U.S. PATENT DOCUMENTS

| 2015/0203111 A1* | 7/2015 | Bonnet | B62D 15/027 701/25 |
| 2015/0367845 A1* | 12/2015 | Sannodo | B60W 10/20 701/23 |
| 2016/0378104 A1 | 12/2016 | Hiei et al. | |
| 2017/0259850 A1* | 9/2017 | Yamashita | B62D 6/00 |

FOREIGN PATENT DOCUMENTS

| DE | 10 2012 212 900 A1 | 1/2014 | |
| DE | 102012212900 A1 * | 1/2014 | ........... B62D 15/027 |
| DE | 10 2012 015 922 A1 | 2/2014 | |
| EP | 2 295 281 A1 | 3/2011 | |
| EP | 2295281 A1 * | 3/2011 | ............... B62D 1/00 |
| JP | 2009-202610 A | 9/2009 | |
| JP | 2015-16803 A | 1/2015 | |
| WO | WO 2014/162753 A1 | 10/2014 | |

OTHER PUBLICATIONS

Japanese-language Written Opinion (PCT/ISA/237) issued in PCT Application No. PCT/JP2016/057120 dated May 24, 2016 (Five (5) pages).
Extended European Search Report issued in counterpart European Application No. 16772120.8 dated Oct. 16, 2018 (nine (9) pages).

* cited by examiner

FIG. 2

| | | TYPICAL CONTROL SETTING | REMOTE CONTROL SETTING |
|---|---|---|---|
| OPERATION PARAMETERS | STEERING SPEED | IF STEERING SPEED IS FAST, RIDING COMFORT DETERIORATES | CAN BE RAISED TO LIMIT OF HARDWARE |
| | STATIONARY STEERING | IS NOT USED AS MUCH AS POSSIBLE | MAY BE USED<br>HIGH-SPEED STEERING IS ALSO POSSIBLE |
| | VEHICLE SPEED | CANNOT BE RAISED BECAUSE RIDING COMFORT DETERIORATES | CAN BE RAISED TO SPEED CAPABLE OF AVOIDING OBSTACLE |
| | ACCELERATION | CANNOT BE RAISED BECAUSE RIDING COMFORT DETERIORATES | CAN BE RAISED TO CERTAIN EXTENT IN WHICH TIRE DOES NOT SLIP |
| | FORWARD/BACKWARD MOVEMENT SWITCHING WAITING TIME | TIME IS NECESSARY FROM STOPPING TO DEPARTURE BECAUSE BACK AND FORTH G IS APPLIED | SHORTEST TIME FROM STOPPING TO DEPARTURE CAN BE SET |
| ROUTE PARAMETERS | REDUCTION OF UNCOMFORTABLE FEELING | PRIORITY IS GIVEN | PRIORITY IS NOT GIVEN |
| | OBSTACLE SHORTEST DISTANCE | PRIORITY IS NOT GIVEN | PRIORITY IS GIVEN |
| | ENVIRONMENT RECOGNITION | PRIORITY IS NOT GIVEN | PRIORITY IS GIVEN |

VEHICLE AUTOMATIC PARKING CONTROL DEVICE

CROSS REFERENCE TO RELATED APPLICATIONS

This application is a divisional of U.S. application Ser. No. 15/557,191, filed on Sep. 11, 2017, which is a National Stage of PCT/JP2016/057120, filed on Mar. 8, 2016, which claims priority from Japanese Patent Application No. 2015-066363, filed on Mar. 27, 2015, the disclosure of which are expressly incorporated by reference herein.

TECHNICAL FIELD

The present invention relates to a vehicle control device.

BACKGROUND ART

A need for automatic parking, in which a vehicle is parked at a desired parking position without performing a vehicle control by a vehicle passenger, has increased. PTL 1 discloses the invention in which a final parking position of a vehicle is determined in accordance with whether or not a vehicle passenger on the passenger seat is present or a load mounting situation on the passenger seat.

CITATION LIST

Patent Literature

PTL 1: Japanese Unexamined Patent Application Publication No. 2009-202610

SUMMARY OF INVENTION

Technical Problem

In the invention disclosed in PTL 1, only the final parking position is considered, and there is no consideration of behavior of a vehicle in execution of the automatic parking. The present inventors found a problem related to execution of automatic parking in accordance with a behavior corresponding to a situation.

Solution to Problem

According to a first aspect of the present invention, a vehicle control device, includes: an environment recognition unit that recognizes a surrounding environment of a vehicle; a parking route generation unit that generates a travel route to a parking position determined on the basis of the surrounding environment that is recognized; a signal input unit to which a parking command signal is input; and a travel control unit that allows the vehicle to travel to the parking position along the travel route on the basis of the parking command signal that is input, wherein the vehicle is driven to perform automatic parking travel to the parking position in a behavior different between a situation in which the parking command signal input to the signal input unit is a first parking command signal and a situation in which the parking command signal input to the signal input unit is a second parking command signal.

Advantageous Effects of Invention

According to the invention, it is possible to realize automatic parking in which a behavior of a vehicle is allowed to vary in correspondence with a situation.

BRIEF DESCRIPTION OF DRAWINGS

FIG. 2 is a table illustrating a list of operation parameters and route parameters for a typical use and a remote use.

DESCRIPTION OF EMBODIMENTS

First Embodiment

Hereinafter, description will be given of a first embodiment of a vehicle control device according to the invention with reference to FIGS. 1 to 17.

(Configuration)

Figure 1:
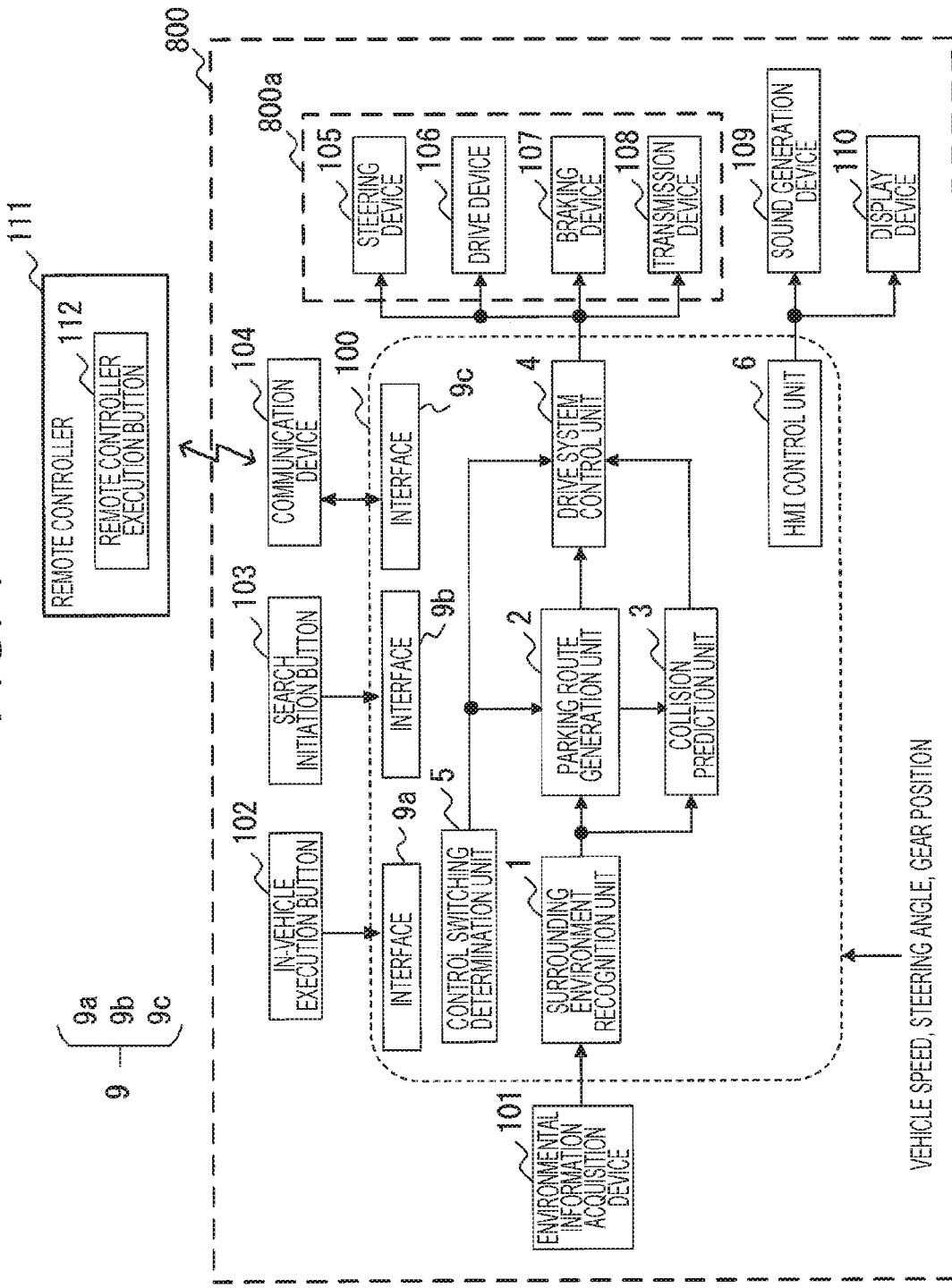
FIG. 1 is a block diagram illustrating a configuration of a vehicle.

FIG. 1 is a block diagram illustrating a configuration of a vehicle 800 on which a vehicle control device 100 according to this embodiment of the invention is mounted. The vehicle 800 includes the vehicle control device 100, an environmental information acquisition device 101, an in-vehicle execution button 102, a search initiation button 103, a communication device 104, a travel drive system 800a, a sound generation device 109, and a display device 110. The travel drive system 800a includes a steering device 105, a drive device 106, a braking device 107, and a transmission device 108. The communication device 104 performs a wireless communication with a remote controller 111. The remote controller 111 includes a remote controller execution button 112 that is a press button.

The travel drive system 800a receives not only an operation command from the vehicle control device 100 but also a manual operation command that is issued by a driver. That is, the vehicle 800 can perform not only automatic driving by the vehicle control device 100 but also manual driving by the driver.

The vehicle control device 100 is a computer that controls the vehicle 800, and includes interfaces 9a, 9b, and 9c, and a CPU, a ROM, and a RAM which are not illustrated. In the following description, in a case where it is not necessary to particularly discriminate the interfaces 9a, 9b, and 9c, these interfaces are collectively referred to as "interface 9". The CPU of the vehicle control device 100 develops a program stored in the ROM in the RAM and executes the program, and allows the vehicle control device 100 to function as a surrounding environment recognition unit 1, a parking route generation unit 2, a collision prediction unit 3, a drive system control unit 4, a control switching determination unit 5, and an HMI control unit 6. That is, the surrounding environment recognition unit 1, the parking route generation unit 2, the collision prediction unit 3, the drive system control unit 4, the control switching determination unit 5, and the HMI control unit 6 conceptually represent functions realized by a software program as functional blocks.

The respective functional blocks, that is, the surrounding environment recognition unit 1, the parking route generation unit 2, the collision prediction unit 3, the drive system control unit 4, the control switching determination unit 5, and the HMI control unit 6 can grasp a state of the interface 9. That is, it is possible to determine that a signal is input to which interface among the interfaces 9a, 9b, and 9c.

The vehicle control device 100 is connected to the travel drive system 800a, the environmental information acquisition device 101, the sound generation device 109, the display device 110, the in-vehicle execution button 102, the search initiation button 103, and the communication device 104. The vehicle control device 100 is connected to a CAN (not illustrated) and the like of the vehicle 800, and vehicle information of the vehicle 800 such as a vehicle speed, a steering angle, and a gear position is input to the vehicle control device 100.

The environmental information acquisition device 101 acquires information related to a surrounding environment of the vehicle 800, and is constituted by four in-vehicle cameras which photograph surrounding environments on a forward side, a backward side, a rightward side, and a leftward side of the vehicle 800, respectively. An image obtained by each of the in-vehicle cameras is output to the vehicle control device 100 by using an exclusive line and the like in a state of analog data, or in a state of being subjected to A/D conversion. In the in-vehicle camera, a spatial resolution becomes higher as it goes toward the center of an angle of view. Accordingly, it is possible to acquire a high-resolution image of a photographing target without distortion by using the in-vehicle camera that photographs the rightward side or the leftward side when the vehicle 800 goes straight through a position just beside the photographing target.

The search initiation button 103 is an operation member that is provided at a position capable of being operated by a driver. When the search initiation button 103 is pressed by the driver, a signal indicating that the search initiation button 103 is pressed is output to the interface 9b of the vehicle control device 100.

The in-vehicle execution button 102 is an operation member that is provided at a position capable of being operated by the driver. When the in-vehicle execution button 102 is pressed by the driver, a signal indicating that the in-vehicle execution button 102 is pressed is output to the interface 9a of the vehicle control device 100. The driver repetitively presses the in-vehicle execution button 102 to allow the vehicle 800 to execute automatic parking.

The communication device 104 performs a wireless communication with the remote controller ill. When receiving a signal indicating that the remote controller execution button 112 of the remote controller 111 is pressed, the communication device 104 outputs the signal to the interface 9c of the vehicle control device 100.

The steering device 105 is constituted by an electric power steering, a hydraulic power steering, and the like which are capable of controlling a steering angle by using an electric or hydraulic actuator, and the like on the basis of a drive command that is input.

The drive device 106 is constituted by an electric power train system and the like which are capable of controlling a drive force in accordance with a drive command transmitted from an outer side to an engine system capable of controlling engine torque with an electric throttle, a motor, and the like on the basis of a drive command that is input.

The braking device 107 is constituted by an electric brake, a hydraulic brake, and the like which are capable of controlling a braking force with an electric or hydraulic actuator and the like on the basis of a braking command that is input.

The transmission device 108 is constituted by a transmission and the like capable of switching a forward movement or a backward movement with an electric or hydraulic actuator and the like on the basis of a transmission command that is input.

The sound generation device 109 is constituted by a speaker and the like, and is used to output an alarm, voice guidance, and the like to a driver.

The display device 110 is constituted by a display of a navigation device and the like, a meter panel, an alarm lamp, and the like. In addition to an operation screen of the vehicle control device 100, an alarm screen and the like, which visually transmits a danger of collision of the vehicle 800 with an obstacle and the like to the driver, are displayed on the display device 110.

The remote controller 111 is an output device that wirelessly outputs an operation command to the vehicle control device 100 mounted on the vehicle 800. The remote controller 111 includes the remote controller execution button 112 that is a press button. When the remote controller execution button 112 is pressed, the remote controller 111 performs a communication with the communication device 104, and notifies the communication device 104 of a situation in which the remote controller execution button 112 is pressed. In a period in which the remote controller execution button 112 is continuously pressed, notification to the communication device 104 continues.

The functional blocks, which constitute the vehicle control device 100, will now be described.

The surrounding environment recognition unit 1 detects a shape or a position of objects such as a stationary three-dimensional object, a moving body, road surface paint such as a parking range line, and a mark at the periphery of the vehicle 800 by using image data that is obtained by capturing an image of the periphery of the vehicle 800 and is input from the environmental information acquisition device 101. In addition, the surrounding environment recognition unit 1 has a function of determining whether or not a road surface is in a state in which the vehicle 800 can travel by detecting unevenness of the road surface, and the like. Examples of the stationary three-dimensional object include a parked vehicle, a wall, a pole, a pylon, a curbstone, a car stopper, and the like. Examples of the moving body include a pedestrian, a bicycle, a bike, a vehicle, and the like. In the following description, both of the stationary three-dimensional object and the moving body are collectively referred to as an obstacle. The shape or the position of the objects is detected by using a pattern matching method or other known technologies. For example, the position of the objects is expressed by a coordinate system having the origin at a position of the in-vehicle camera that photographs the forward side of the vehicle 800.

The surrounding environment recognition unit 1 detects a parking-possible region for the vehicle 800, that is, a parking space on the basis of information related to the detected shape or position of the objects, a result of the determination on whether or not a road surface is in a state in which the vehicle 800 can travel, and already known dimensions of the vehicle 800. A final parking position of the vehicle 800 in automatic parking, that is, a target parking position is set in the parking space.

The parking route generation unit 2 generates a target trajectory along which the vehicle 800 moves from a current host vehicle position to the target position. The parking route generation unit 2 in this embodiment generates the target trajectory on the basis of an obstacle position and a parking-possible space which are detected by the surrounding environment recognition unit 1, and route parameters output from the control switching determination unit 5.

The collision prediction unit 3 determines whether or not collision with an obstacle occurs when the vehicle 800 travels along the target trajectory generated by the parking route generation unit 2. The collision prediction unit 3 estimates a movement route of a moving body that becomes an obstacle on the basis of a recognition result of the surrounding environment recognition unit 1, and determines whether or not the vehicle 800 collides with the moving body in accordance with a determination on whether or not the target trajectory of the vehicle 800 and the estimated movement route of the moving body intersect each other. As to be described later, when the collision prediction unit 3 determines that collision occurs, vehicle control device 100 decelerates or stops the vehicle 800 so as to avoid collision. Then, when the collision prediction unit 3 determines that a concern of collision disappears due to movement of the moving body, and the like, the vehicle control device 100 drives the vehicle 800.

The drive system control unit 4 controls the travel drive system 800a to move the vehicle 800 along the target trajectory generated by the parking route generation unit 2. The drive system control unit 4 uses operation parameters output from the control switching determination unit 5, that is, the highest speed, the maximum acceleration, forward/backward movement switching waiting time, and stationary steering angular velocity of the vehicle 800 for a control of the travel drive system 800a. The forward/backward movement switching waiting time represents waiting time in a stopped state when switching from a forward movement to a backward movement, or from the backward movement to the forward movement. The stationary steering angular velocity represents an angular velocity in a case of changing a steering angle in a state of stopping the vehicle 800. Furthermore, a speed and an angular velocity of the steering angle in travel are determined, a travel trajectory is uniquely determined, and thus the angular velocity of the steering angle in travel is not defined in this embodiment. That is, when a behavior of the vehicle 800 is determined so as to satisfy conditions of the operation parameters output from the control switching determination unit 5 in accordance with the target trajectory generated by the parking route generation unit 2, as a result thereof, the angular velocity of the steering angle in travel is determined.

The drive system control unit 4 calculates a target steering angle and a target speed on the basis of the target trajectory output from the parking route generation unit 2, the collision prediction output from the collision prediction unit 3, and the operation parameters output from the control switching determination unit 5. The drive system control unit 4 outputs target steering torque for realization of the target steering angle that is calculated to the steering device 105. In addition, the drive system control unit 4 outputs target engine torque or a target brake pressure for realization of a target speed to the drive device 106 or the braking device 107. In a case where collision between the vehicle 800 and an obstacle is predicted by the collision prediction unit 3, the drive system control unit 4 calculates a target steering angle and a target speed in order for the vehicle 800 not to collide with the obstacle, and performs output to the steering device 105, the drive device 106, and the braking device 107 on the basis of the target steering angle and the target speed. When determining that the vehicle 800 arrives at a position at which the vehicle 800 switches a forward movement and a backward movement from each other, the drive system control unit 4 outputs a transmission command to the transmission device 108.

The HMI control unit 6 appropriately generates information, which is notified to a driver or a passenger, in correspondence with a situation, and outputs the information to the sound generation device 109 and the display device 110. The interface 9a receives an operation signal from the in-vehicle execution button 102, the interface 9b receives an operation signal from the search initiation button 103, and the interface 9c receives an operation signal of the remote controller execution button 112 from the communication device 104. For example, when a predetermined voltage is applied, the interface 9 determines that a notification is given. In this manner, the vehicle control device 100 determines which button is pressed in accordance with a situation in which the notification is given to which interface. In the following description, the operation signal of the remote controller execution button 112 is also referred to as "first parking command signal", and the operation signal of the in-vehicle execution button 102 is also referred to as "second parking command signal".

The control switching determination unit 5 recognizes which of the in-vehicle execution button 102 and the remote controller execution button 112 is pressed, and switches route parameters which are output to the parking route generation unit 2 and operation parameters which are output to the drive system control unit 4. That is, the control switching determination unit 5 recognizes an input signal as any one of the first parking command signal and the second parking command signal, and switches the route parameters and the operation parameters which are output. As each of the parameters, two kinds corresponding to typical control setting and remote control setting are present. In the following description, the typical control setting may be referred to as "for a typical use", and the remote control setting may be referred to as "for a remote use". In a case where the control switching determination unit 5 recognizes that the in-vehicle execution button 102 is pressed, this case is set as the typical control setting. In a case where the control switching determination unit 5 recognizes that the remote controller execution button 112 is pressed, this case is set as the remote control setting.

As to be described later, the operation parameters and the route parameters for a typical use assume that a passenger is present in the vehicle 800, and the operation parameters and the route parameters for a remote use assume that a person is not present in the vehicle 800. Accordingly, the following difference is present between the typical use and the remote use.

FIG. 2 is a table illustrating a list of the operation parameters and the route parameters for the typical use and the remote use. In an example of FIG. 2, the operation parameters include a steering speed, stationary steering, a vehicle speed, an acceleration, and forward/backward movement switching time. The operation parameters are parameters which are used for a vehicle control. The route parameters are parameters which are used for calculation of a route up to a target parking position, and include the following three parameters. The route parameter may include route parameters other than the three parameters.

(1) A parameter related to a route for reducing uncomfortable feeling of a passenger in the vehicle in automatic parking travel. Hereinafter, the parameter is referred to as "uncomfortable feeling reducing parameter".

(2) A parameter related to a route in which a distance between a vehicle and an obstacle is further lengthened in an automatic parking travel command from an outer side in comparison to a command from an inner side of the vehicle. Hereinafter, the parameter is referred to as "obstacle shortest distance parameter".

(3) A parameter related to a route of the vehicle 800 that has a great effect on recognition of a parking position by the surrounding environment recognition unit 1. Hereinafter, the parameter is referred to as "environment recognition parameter".

The operation parameters will now be described.

In the typical control setting, it is difficult to increase a steering operation speed for application of a steering speed so much from the viewpoint of riding comfortability. In this embodiment, for example, a rotational speed of a steering is set to 180°/second or less. In the remote control setting, it is possible to realize a high speed up to the hardware limit of the steering. In this embodiment, for example, the rotational speed of the steering is set to 500°/second to the maximum.

The stationary steering, that is, changing of the steering angle in a stopped state is avoided as much as possible in the typical control setting when considering that the stationary steering is rarely performed in a typical situation. In the remote control setting, the stationary steering may be appropriately performed as necessary.

In the typical control setting, the upper limit of the vehicle speed is limited from the viewpoint of riding comfortability. In this embodiment, for example, the upper limit is set to 3 km/h or less in a forward movement, and 2 km/h or less in a backward movement. In the remote control setting, the vehicle speed can be raised up to a speed capable of avoiding an obstacle. For example, the vehicle speed is set to 5 km/h or less in both of the forward movement and the backward movement.

In the typical control setting, the upper limit of the acceleration is limited regardless of a positive value and a negative value thereof from the viewpoint of riding comfortability. For example, the upper limit is set to 0.5 m/s$^2$ or less. In the remote control setting, the acceleration can be raised to a certain extent in which a tire does not slip. For example, the upper limit is set to 2.0 m/s$^2$.

With regard to the forward/backward movement switching time, time is necessary from stopping to departure because the riding comfort deteriorates in the typical control setting. For example, the forward/backward movement switching time is set to 2 seconds or longer. In the remote control setting, the shortest time (shift switching time) can be set from stopping to departure, and the shortest time is set to, for example, 0.5 seconds or longer.

The above-described values are selected as the operation parameters.

The route parameters will now be described.

The uncomfortable feeling reducing parameter is determined as follows. In the typical control setting, the uncomfortable feeling reducing parameter is determined by a passenger with focus given to absence of uncomfortable feeling in a route of the vehicle 800. In the remote control setting, a focus is not given to matching between a target route and feeling of a user. For example, in automatic parking in a remote mode, a focus is given to time necessary to complete parking, and a target route in which a straight line is frequently used is set. In this manner, in the typical control setting and the remote control setting, uncomfortable feeling reducing parameters different from each other are set.

The obstacle shortest distance parameter is determined as follows. In the typical control setting, it is assumed that a passenger is present in a vehicle. Accordingly, even during automatic parking, confirmation by a driver is possible. That is, in the typical control setting, there is no problem if a distance between a host vehicle and an obstacle is secured to a certain extent. Accordingly, calculation of a target route, in which the shortest distance from the obstacle is lengthened, is not performed. In the remote control setting, it is assumed that a driver is present on an outer side of the vehicle 800. Accordingly, an obstacle may be hidden by the vehicle 800, and thus a collision site of the vehicle 800 may not be confirmed in some cases. Accordingly, in the remote control setting, the calculation of the target route is performed in such a manner that a distance from the obstacle is further lengthened in comparison to a case where a passenger is present in a vehicle.

In this manner, in the typical control setting and the remote control setting, obstacle shortest distance parameters different from each other are set.

The environment recognition parameter is determined as follows. In the remote control setting, the environment recognition parameter is set to perform calculation of a route, in which reliability of a recognized parking position is raised, so as to secure a distance from an obstacle after accurately recognizing the obstacle.

The route, in which reliability of a recognized parking space is raised, represents the following route. For example, the environmental information acquisition device 101 of the vehicle 800 is provided with the four in-vehicle cameras which photograph the forward side, the backward side, the rightward side, and the leftward side in a travel direction. Optical axes of the in-vehicle cameras face a vehicle forward/backward movement direction, and a rightward/leftward direction of the vehicle which is perpendicular to the forward/backward movement direction. The in-vehicle cameras are super-wide angle cameras on which a fish-eye lens is mounted. Accordingly, resolution of a peripheral region distant from the optical axes significantly decreases. Accordingly, so as to reproduce a surrounding environment from a photographed image with accuracy and to grasp a parking space in detail, it is necessary to obtain a high-resolution image of a photographing target by performing photographing while allowing a vehicle to travel so that the optical axes of the in-vehicle cameras rightly face the parking space.

According to this, a route of the vehicle 800 which is appropriate for the photographing of the parking space is a going-straight route just beside the parking space. That is, in the remote control setting, when route calculation is performed by using the environment recognition parameter, a route, which includes a going-straight route in a direction perpendicular to a travel direction when a vehicle parked at the target parking position departs, is set.

With regard to an image photographed during traveling of the vehicle along the route, since an optical axial direction of the in-vehicle camera provided on a lateral side of the vehicle matches a forward/backward movement direction of the vehicle that is parked at the target parking position, a high-resolution image without distortion is obtained. As a result, an accurate position and accurate shape dimensions of the parking space can be calculated. In addition, even in a shape, which is difficult to recognize, from an image of an elongated antenna and the like, if the image has high resolution, detection is easy.

(Four Modes of Vehicle Control Device)

The vehicle control device 100 has four operation modes. The four modes include an idle mode, a parking space search mode, an automatic parking mode, and a fail mode. As to be described later, the modes transition in the order of the idle mode, the parking space search mode, the automatic parking mode, and the idle mode. However, in a case of transition from the automatic parking mode to the fail mode, transition occurs from the fail mode to the idle mode. Hereinafter, the respective modes will be described.

(Idle Mode)

In the idle mode, the vehicle control device 100 is in a state in which the vehicle control device 100 waits an instruction from a driver, and does not perform any special operation. That is, in the idle mode, the drive system control unit 4 does not output an operation command to the travel drive system 800a, and a driver performs manual driving. When the driver presses the search initiation button 103, the mode transitions to the parking space search mode.

(Parking Space Search Mode)

In the parking space search mode, the vehicle control device 100 acquires information related to a surrounding environment from the environmental information acquisition device 101, and searches a parking-possible region for the vehicle 800. The parking-possible region represents a space wider than the vehicle 800 and a region which the vehicle 800 can reach without collision with an obstacle. When the surrounding environment recognition unit 1 detects the parking-possible region, the HMI control unit 6 notifies a driver of the parking-possible region by using the sound generation device 109 and the display device 110.

When the driver selects a parking space by using an input unit (not illustrated), the mode transitions to the automatic parking mode.

In the parking space search mode, the drive system control unit 4 does not output an operation command to the travel drive system 800a, and the driver performs manual driving. That is, the vehicle control device 100 searches the parking-possible region while the manual driving by the driver.

(Automatic Parking Mode)

In the automatic parking mode, when the in-vehicle execution button 102 or the remote controller execution button 112 is pressed by a user, the vehicle control device 100 determines a target parking position, and automatic parking of the vehicle 800 is performed. Pressing of the in-vehicle execution button 102 or the remote controller execution button 112 by the user is released, that is, a finger is separated from the button, and the vehicle control device 100 stops the vehicle 800. The control switching determination unit 5 recognizes that which button of the in-vehicle execution button 102 or the remote controller execution button 112 is pressed by the user, and switches the operation parameters and the route parameters as to be described later.

When determining that the vehicle 800 reaches the target parking position, the vehicle control device 100 transitions the mode to the idle mode, and notifies the driver of this situation. When the vehicle control device 100 determines that both of the in-vehicle execution button 102 and the remote controller execution button 112 are pressed, the mode transitions to the fail mode.

(Fail Mode)

In the fail mode, the vehicle control device 100 stops the vehicle 800. When the vehicle 800 is stopped, the vehicle control device 100 transitions the mode to the idle mode, and notifies the drivers of this situation.

(Flowchart)

Description will be given of the transition of the above-described four modes, and details of operations of the modes with reference to flowcharts illustrated in FIGS. 3 to 8. An execution subject of respective steps in the flowcharts illustrated in FIGS. 3 to 8 is a CPU of the vehicle control device 100.

(Flowchart of Uppermost Stream Processing)

Figure 3:
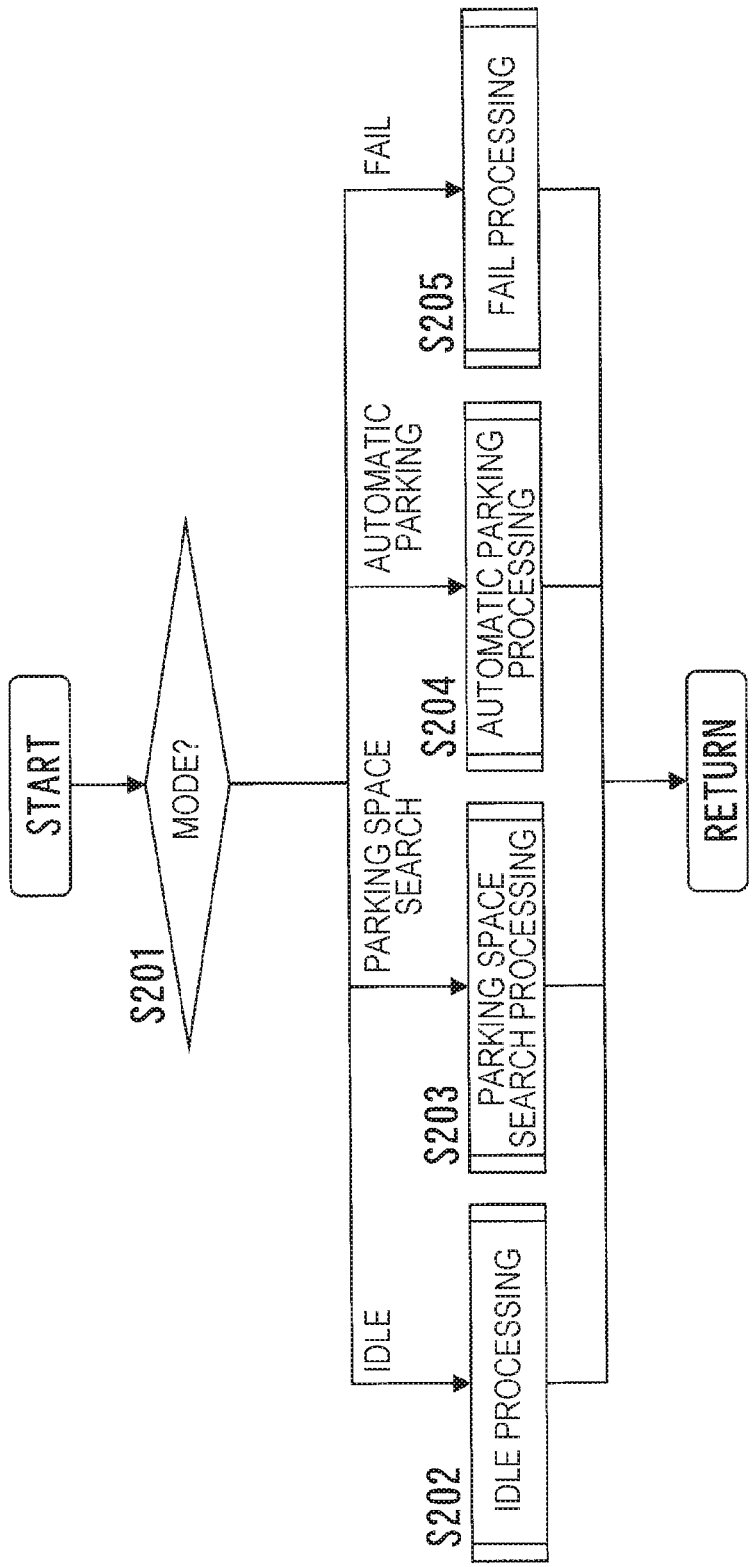
FIG. 3 is a flowchart illustrating uppermost stream processing of a vehicle control device.

FIG. 3 is a flowchart illustrating uppermost stream processing. When the vehicle control device 100 is activated, the mode is set to the idle mode, and a program, of which an operation is illustrated in FIG. 3, is operated. When the operation of the program is terminated, the program, of which an operation is illustrated in FIG. 3, is operated again. However, in a case of operating the program at the second time or later, the mode setting is not performed. That is, a mode in a previous operation of the program is taken over.

In step S201, a current mode is determined. In a case of determination as the idle mode, it proceeds to step S202. In a case of determination as the parking space search mode, it proceeds to step S203. In a case of determination as the automatic parking mode, it proceeds to step S204. In a case of determination as the fail mode, it proceeds to step S205.

Figure 4:
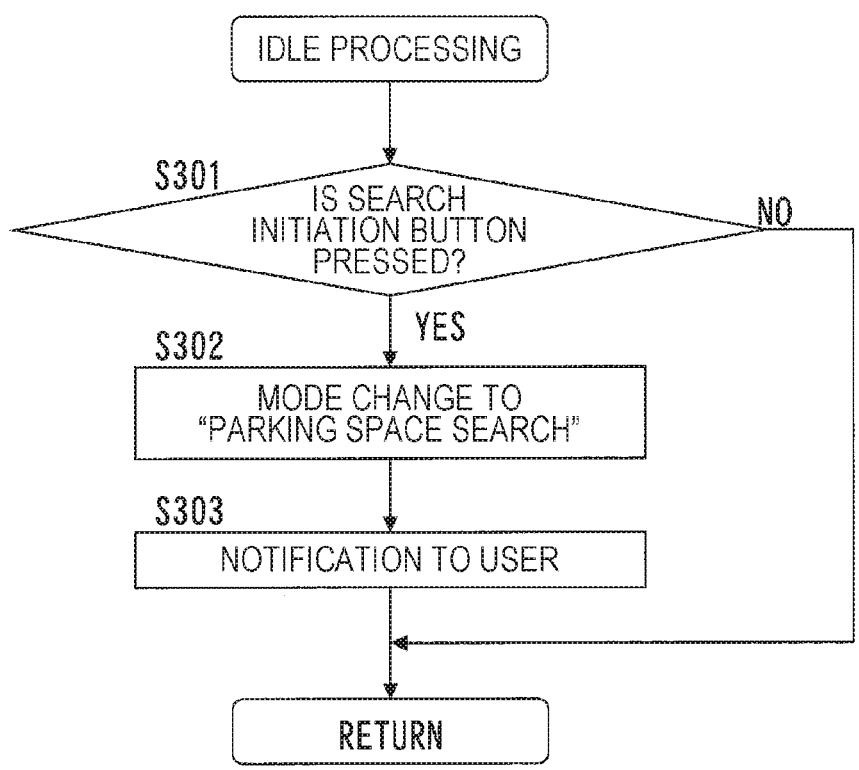
FIG. 4 is a subroutine illustrating idle processing.
Figure 5:
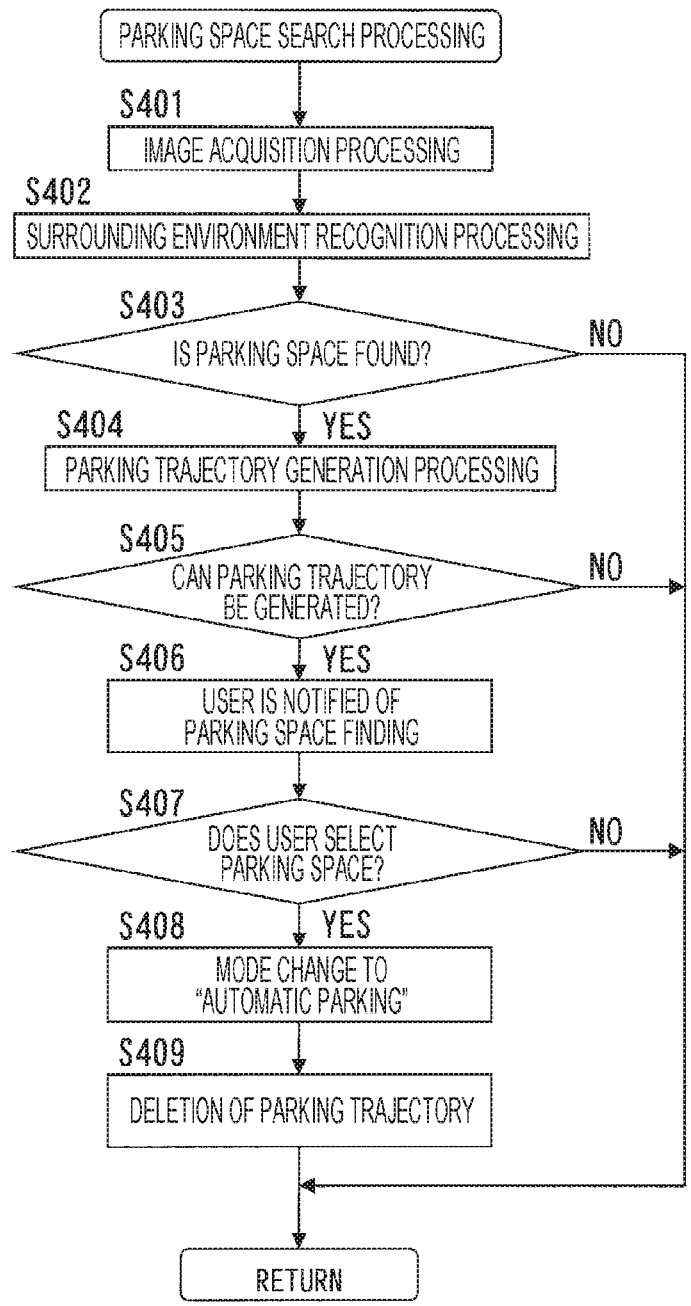
FIG. 5 is a subroutine illustrating parking space search processing.
Figure 6:
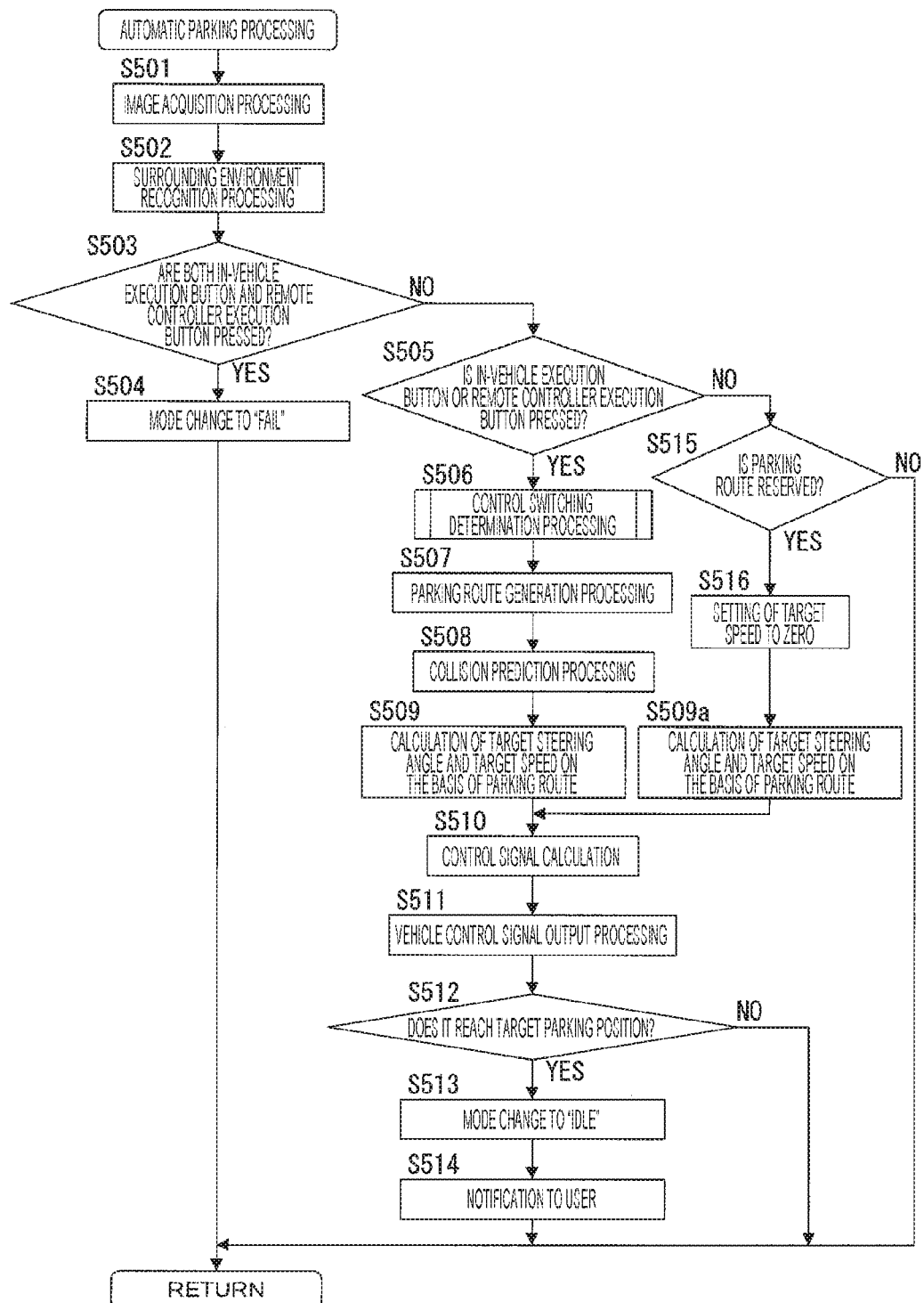
FIG. 6 is a subroutine illustrating automatic parking processing.
Figure 8:
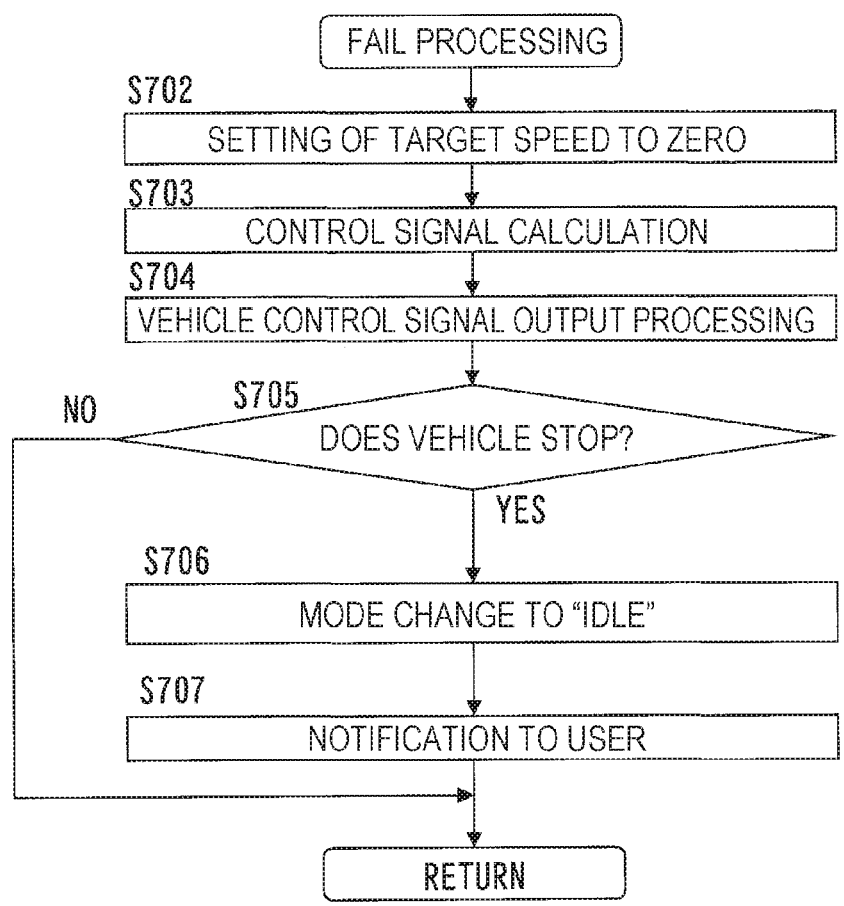
FIG. 8 is a subroutine illustrating fail processing.

In step S202, a subroutine of idle processing as illustrated in FIG. 4 is executed. When the execution is terminated, this program is terminated. In step S203, a subroutine of parking space search processing as illustrated in FIG. 5 is executed. When the execution is terminated, this program is terminated. In step S204, a subroutine of automatic parking processing as illustrated in FIG. 6 is executed. When the execution is terminated, this program is terminated. In step S205, a subroutine of fail processing as illustrated in FIG. 8 is executed. When the execution is terminated, this program is terminated.

(Subroutine of Idle Processing)

FIG. 4 is a subroutine of the idle processing which is activated from step S202 in FIG. 3.

In step S301, it is determined whether or not the search initiation button 103 is pressed. In a case of determination as pressing, it proceeds to step S302. In a case of determination as not-pressing, the subroutine illustrated in FIG. 4 is terminated, and it returns to FIG. 3.

In step S302, the mode is changed to the parking space search mode, and it proceeds to step S303.

In step S303, a user is notified of the mode change to the parking space search mode, the subroutine illustrated in FIG. 4 is terminated, and it returns to FIG. 3.

(Subroutine of Parking Space Search Processing)

FIG. 5 is the subroutine of the parking space search processing which is activated from step S203 in FIG. 3.

In step S401, image data is fetched from the environmental information acquisition device 101, and it proceeds to step S402.

In step S402, the image data fetched in step S401 is input to the surrounding environment recognition unit 1, and a shape or a position of objects such as a stationary three-dimensional object, a moving body, road surface paint such as a parking range line, and a mark at the periphery of the vehicle 800 is detected. The surrounding environment recognition unit 1 detects a parking-possible space for the vehicle 800, that is, a parking space on the basis of information related to the detected shape or position of the objects and a result of determination on whether or not a road surface is in a state in which the vehicle 800 can travel. Next, it proceeds to step S403.

In step S403, it is determined whether or not the parking space is detected in step S402. In a case where it is determined that the parking space is detected, it proceeds to step S404. In a case where it is determined that the parking space is not detected, the subroutine illustrated in FIG. 5 is terminated, and it returns to FIG. 3.

In step S404, a trajectory capable of reaching to the parking space detected in step S402 from a current position of the vehicle 800, that is, a travel route is generated, and it proceeds to step S405.

In step S405, it is determined whether or not the trajectory can be generated in step S404. In a case where it is determined that the trajectory can be generated, it proceeds to step S406. In a case where it is determined that the trajectory cannot be generated, the subroutine illustrated in FIG. 5 is terminated, and it returns to FIG. 3. Examples of the case where the trajectory cannot be generated include a case where the periphery of the parking space is surrounded by other vehicles and it is difficult to reach the parking space.

In step S406, the user is notified of a situation in which the parking space is found, and it proceeds to step S407. In step S407, it is determined whether or not the user selects a parking space. In a case where it is determined that the user selects the parking space, it proceeds to step S408. In a case where it is determined that the user does not select the parking space, the subroutine illustrated in FIG. 5 is terminated, and it returns to FIG. 3.

In step S408, the mode is changed to the automatic parking mode, and it proceeds to step S409.

In step S409, the parking trajectory, which is generated in step S404 and is reserved in the RAM, is deleted. As described above, the subroutine illustrated in FIG. 5 is terminated, and it returns to FIG. 3.

(Subroutine of Automatic Parking Processing)

FIG. 6 is the subroutine of the automatic parking processing which is activated from step S204 in FIG. 3.

In step S501, image data is fetched from the environmental information acquisition device 101, and it proceeds to step S502.

In step S502, the image data fetched in step S501 is input to the surrounding environment recognition unit 1, and a shape or a position of objects such as a stationary three-dimensional object, a moving body, road surface paint such as a parking range line, and a mark at the periphery of the vehicle 800 is detected. Next, it proceeds to step S503.

In step S503, it is determined that both of the in-vehicle execution button 102 and the remote controller execution button 112 are pressed, or are in other states. In a case where it is determined that both of the in-vehicle execution button 102 and the remote controller execution button 112 are pressed, it proceeds to step S504. In the other states, that is, in a case where it is determined that any one of the in-vehicle execution button 102 and the remote controller execution button 112 is pressed, or any button is not pressed, it proceeds to step S505.

In step S504, the mode is changed to the fail mode, the subroutine illustrated in FIG. 6 is terminated, and it returns to FIG. 3.

In step S505, it is determined whether any one of the in-vehicle execution button 102 and the remote controller execution button 112 is pressed, or any button is not pressed. In a case where it is determined that any one button is pressed, it proceeds to step S506. In a case where it is determined that any button is not pressed, it proceeds to step S515.

Figure 7:
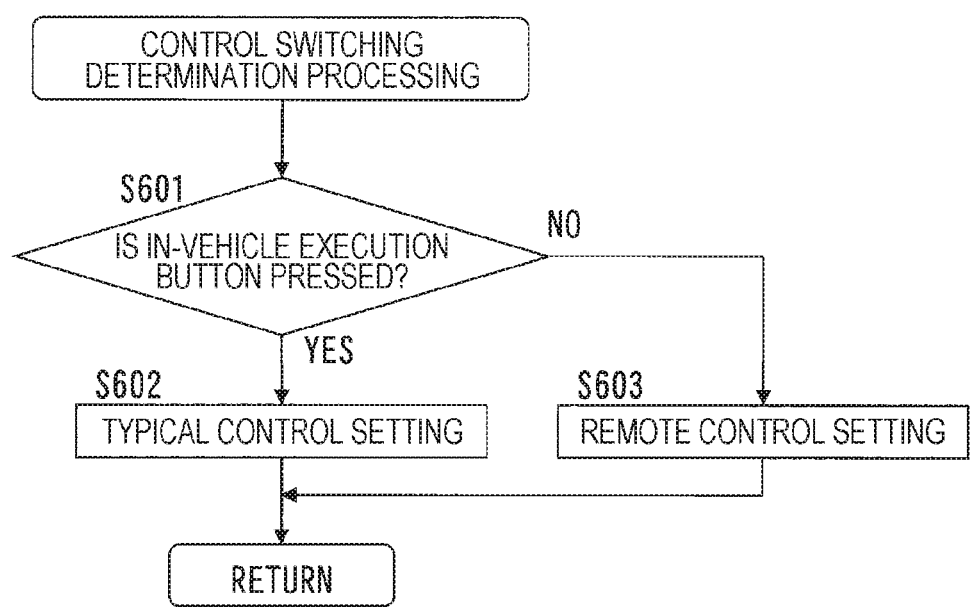
FIG. 7 is a subroutine illustrating control switching determination processing.

In step S506, control switching determination processing, which is to be described later with reference to FIG. 7, is executed, and it proceeds to step S507. Through the control switching determination processing, the route parameters which are input to the parking route generation unit 2, and the operation parameters which are input to the drive system control unit 4 are set to any one between for an in-vehicle use and for a remote use.

In step S507, calculation is made to obtain a trajectory for parking the vehicle 800 at the parking space selected by a driver in the parking space search mode from a current position on the basis of the route parameters set in step S506, and the trajectory is reserved in the RAM. In a case where a trajectory is already reserved in the RAM, over-writing is performed. At this time, a target parking position is determined as well. Next, it proceeds to step S508.

In step S508, in a case where the vehicle 800 moves along the parking trajectory calculated in step S507, it is determined that the vehicle 800 collides with an obstacle. Next, it proceeds to step S509.

In step S509, a target steering angle and a target speed of the vehicle 800 are calculated on the basis of the parking trajectory calculated in step S507, a collision prediction result determined in step S508, and vehicle information of the vehicle 800 such as a vehicle speed, a steering angle, and a gear position which are obtained through a CAN. Next, it proceeds to step S510.

In step S510, a control signal for outputting the target steering angle and the target speed which are calculated in step S509 or step S509a to be described later to the steering device 105, the drive device 106, and the braking device 107 is calculated. Examples of the control signal that is output to the steering device 105 include target steering torque for realizing the target steering angle, but it is also possible to directly output the target speed in accordance with a configuration of the steering device 105. Examples of the control signal that is output to the drive device 106 and the braking device 107 include target engine torque, a target brake pressure, and the like for realizing the target speed, but it is also possible to directly output the target speed in accordance with a configuration of the drive device 106 and the braking device 107. In addition, in a case where the vehicle 800 reaches a turnabout position, that is, a forward/backward movement switching position, and it is necessary to switch a travel direction, a command value is output to the transmission device 108. Next, it proceeds to step S511.

In step S511, the control signal calculated in step S510 is output to the travel drive system 800a, and it proceeds to step S512.

In step S512, it is determined whether or not the vehicle 800 reaches the target parking position. In a case where it is determined that vehicle 800 reaches the target parking position, it proceeds to step S513. In a case where the vehicle 800 does not reach the target position, the subroutine illustrated in FIG. 6 is terminated, and it returns to FIG. 3.

In step S513, the mode is changed to the idle mode, and it proceeds to step S514.

In step S514, a user is notified of the mode change to the idle mode, the subroutine illustrated in FIG. 6 is terminated, and it returns to FIG. 3.

In step S515, it is determined whether or not the target trajectory for parking is reserved in the RAM. In a case where it is determined that the target trajectory is reserved, it proceeds to step S516. In a case where it is determined that the target trajectory is not reserved, the subroutine illustrated in FIG. 6 is terminated, and it returns to FIG. 3. When the in-vehicle execution button 102 or the remote controller execution button 112 is pressed (YES in step S505), a trajectory is generated in step S507 and is reserved in the RAM. That is, in step S515, it is determined whether or not the in-vehicle execution button 102 or the remote controller execution button 112 is pressed and the vehicle 800 starts to move.

In step S516, the target speed of the vehicle 800 is set to zero, and it proceeds to step S509a.

In step S509a, the target steering angle and the target speed of the vehicle 800 are calculated on the basis of the target trajectory reserved in the RAM, the target speed set to zero in step S516, and vehicle information of the vehicle 800 such as a vehicle speed, a steering angle, and a gear position which are obtained through the CAN. In step S516, the target speed is set to zero. However, in a case where a current vehicle speed is fast, if a speed is instantly set to zero, an excessive acceleration occurs, and thus this step is provided. Actually, control processing of gradually reducing the vehicle speed is executed. However, here, the description of the continuous processing is omitted. Next, it proceeds to step S510.

(Subroutine of Control Switching Determination Processing)

FIG. 7 is the subroutine of the control switching determination processing which is activated in step S506 of FIG. 6.

In step S601, it is determined whether or not the in-vehicle execution button 102 is pressed, that is, a signal is input to the interface 9a. In a case where it is determined that the in-vehicle execution button 102 is pressed, it proceeds to step S602. In a case where it is determined that the in-vehicle execution button 102 is not pressed, that is, the remote controller execution button 112 is pressed, it proceeds to step S603.

In step S602, the operation parameters and the route parameters are set to parameters for a typical use, the subroutine illustrated in FIG. 7 is terminated, and it returns to FIG. 6.

In step S603, the operation parameters and the route parameters are set to parameters for a remote use, the subroutine illustrated in FIG. 7 is terminated, and it returns to FIG. 6.

(Subroutine of Fail Processing)

FIG. 8 is the subroutine of the fail processing which is activated in step S205 of FIG. 3 in a case of the fail mode.

In step S702, the target speed is set to zero, and it proceeds to step S703.

In step S703, the target speed of the vehicle 800 is calculated on the basis of the target speed set to zero in step S702, and a vehicle speed of the vehicle 800 which is obtained through the CAN. Next, it proceeds to step S704.

In step S704, a control signal for outputting the target speed calculated in step S703 to the drive device 106 and the braking device 107 is calculated, and it proceeds to step S705.

In step S705, it is determined whether or not the vehicle is stopped. In a case where it is determined that the vehicle is stopped, it proceeds to step 3706. In a case where it is determined that the vehicle is not stopped, the subroutine illustrated in FIG. 8 is terminated, and it returns to FIG. 3.

In step S706, the mode is changed to the idle mode, and it proceeds to step S707.

In step S707, the user is notified of the mode change to the idle mode, subroutine illustrated in FIG. 8 is terminated, and it returns to FIG. 3.

(Operation Example of Automatic Parking)

Hereinafter, description will be given of an operation of the vehicle control device 100 in a case where the vehicle 800 is subjected to backward parking in a parking range of a parking lot with reference to an automatic parking scene in the parking lot.

Figure 9A:
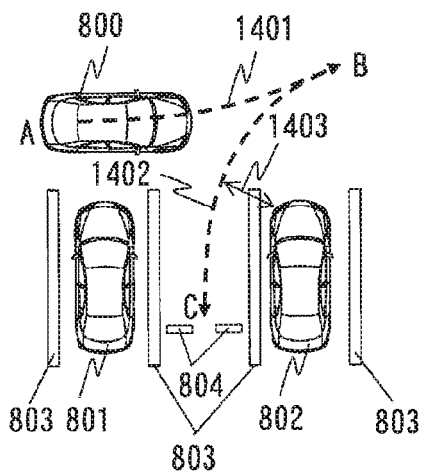
FIGS. 9A and 9B are views illustrating an operation example of double parking in typical control setting.
Figure 9B:
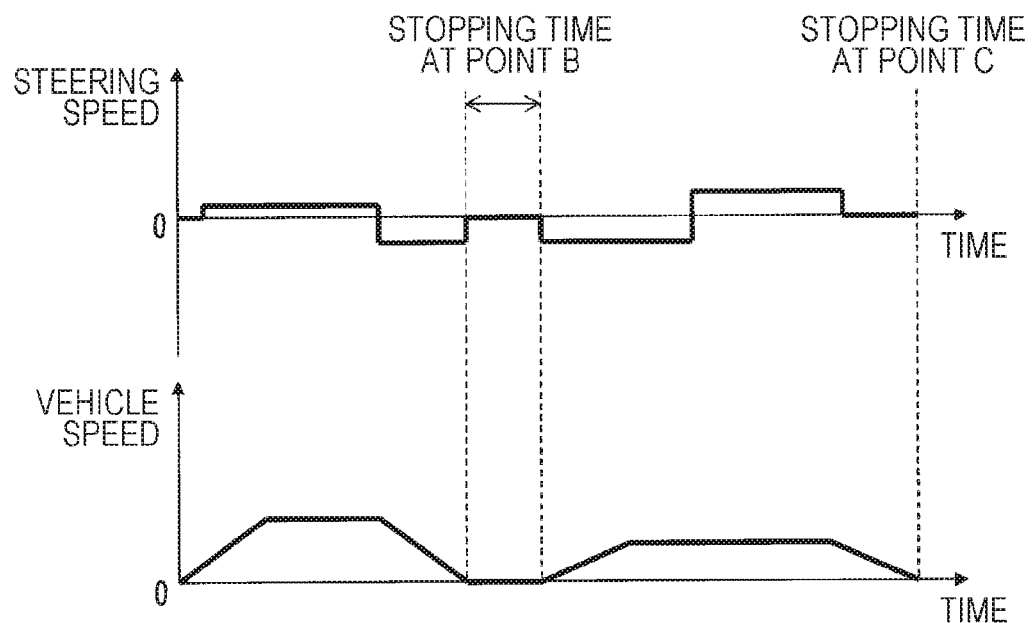
Figure 10A:
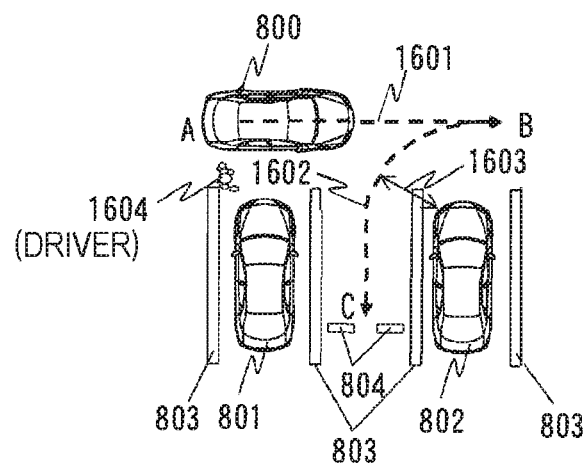
FIGS. 10A and 10B are views illustrating an operation example of double parking in remote control setting.
Figure 10B:
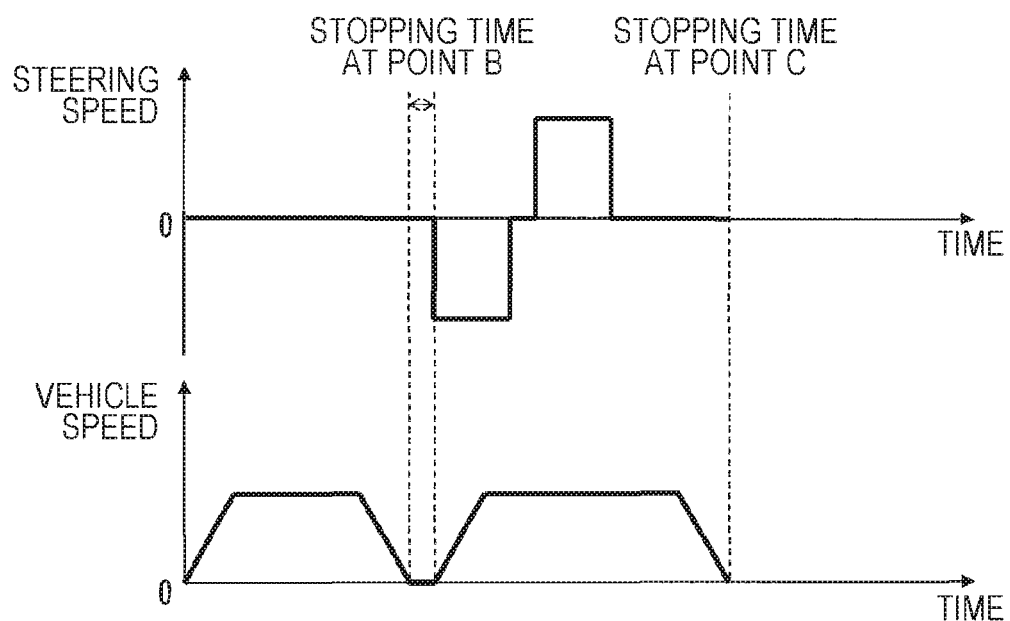

FIGS. 9 and 10 are examples of a double parking in which a plurality of vehicles are horizontally arranged after completion of parking.

Figure 11A:
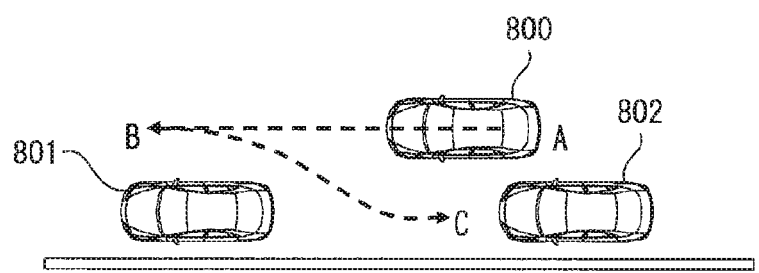
FIGS. 11A and 11B are views illustrating an operation example of parallel parking in the typical control setting.
Figure 11B:
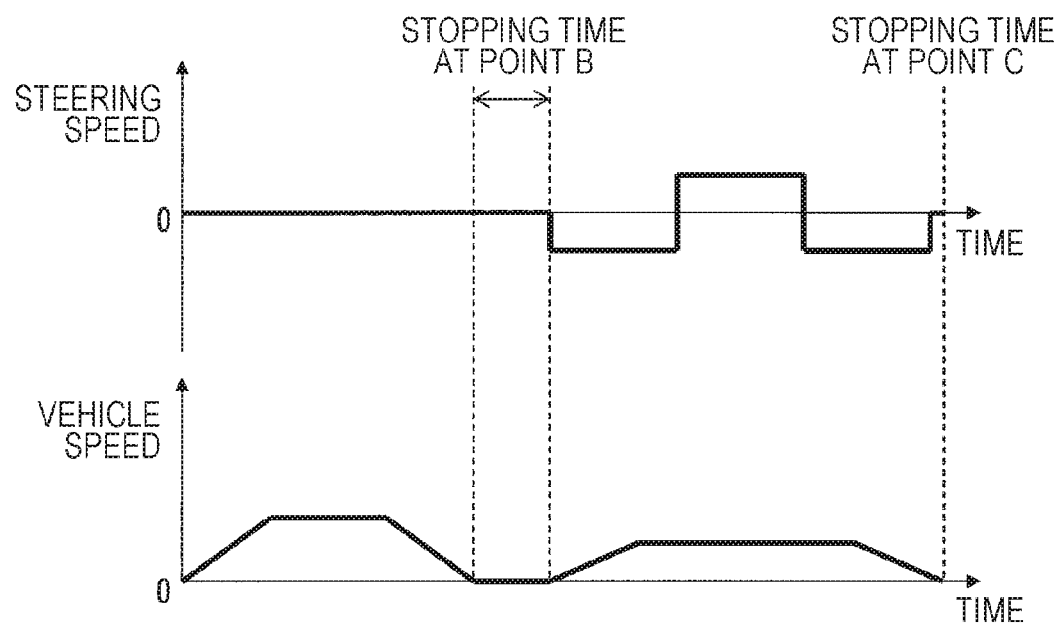
Figure 12A:
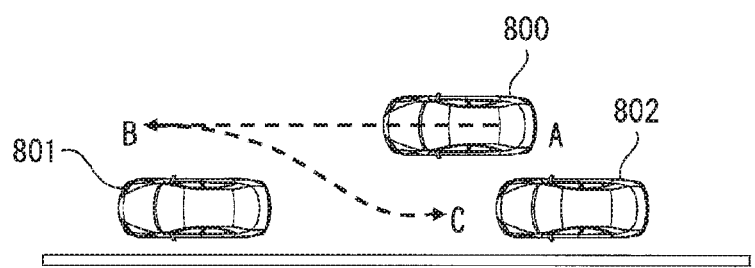
FIGS. 12A and 12B are views illustrating an operation example of parallel parking in the remote control setting.
Figure 12B:
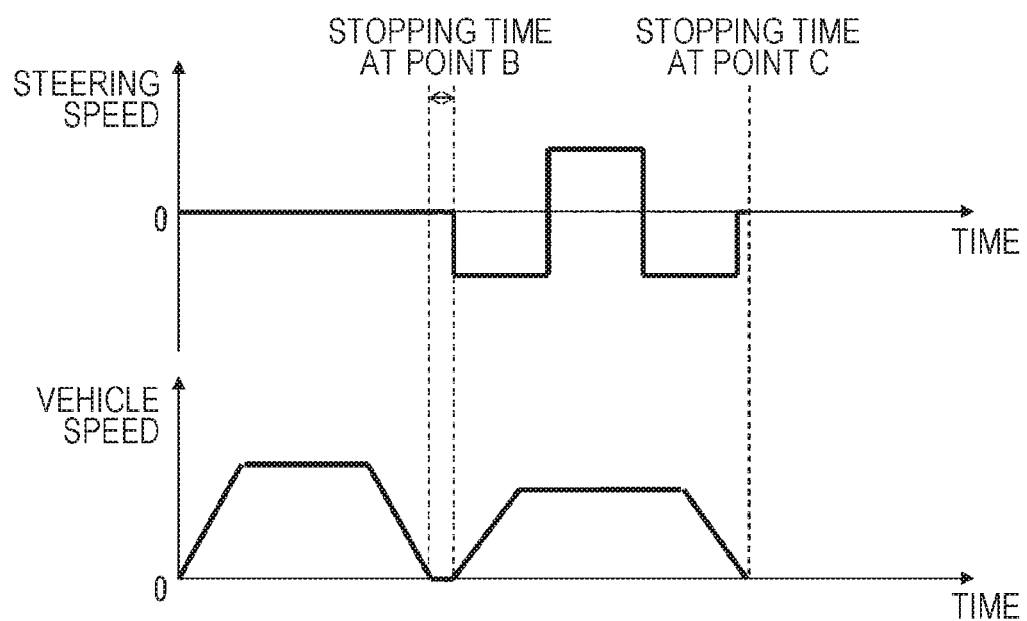

FIGS. 11 and 12 are examples of a parallel parking in which a plurality of vehicles are linearly arranged after completion of parking.

In all examples, a point A represents a position of the vehicle 800 when the automatic parking starts to begin, a point B represents a position at which a forward/backward movement is switched, and a point C represents a target parking position.

In all of FIG. 9 to FIG. 12, (a) represents an overhead image illustrating the periphery of the vehicle 800 that is subjected to the automatic parking, (b) represents a time-series variation of a steering speed and a vehicle speed from initiation to termination of the automatic parking. In the overhead image in (FIG. 9a), double parking spaces for three vehicles, which are divided by a parking range line 803 and in which a car stopper 804 is provided, exist on a right side (lower side in the drawing) of the travel direction of the vehicle 800. Among the parking spaces for three vehicles, parked vehicles 801 and 802 exist in a left parking space and a right parking space, respectively. A parked vehicle does not exist in the central parking space, and thus the vehicle 800 can be parked. The surrounding environment recognition unit 1 detects the parked vehicles 801 and 802, the parking range line 803, and the car stopper 804 by using a known pattern matching method and the like with respect to an image from the environmental information acquisition device 101, and acquires information related to positions thereof. In the operation example, it is assumed that the target route that is generated by the parking route generation unit 2 is constituted by a forward movement route and a backward movement route.

In the operation examples illustrated in FIGS. 9 to 12, it is assumed that in the automatic parking, a driver continuously presses the in-vehicle execution button 102 or the remote controller execution button 112, and when the button operation is stopped, the automatic parking operation is terminated. That is, it is assumed that the driver continuously presses the button until the automatic parking is completed.

Hereinafter, the operation examples in FIGS. 9 to 12 will be described on the above-described assumption.

Description will be given of an example when a vehicle in which a driver is present is subjected to automatic double parking with reference to FIG. 9.

The driver selects a parking space that is the point C in the parking space search mode, and continuously presses the in-vehicle execution button 102. Since the in-vehicle execution button 102 is continuously pressed, the control switching determination unit 5 selects the typical control setting, and the typical route parameters and the typical operation parameters are respectively output to the parking route generation unit 2 and the drive system control unit 4. As illustrated in FIG. 9(*a*), a forward movement route 1401 is gradually curved to the left side, and a backward movement route 1402 is also gradually curved. A point indicated by a symbol B is a point at which a vehicle is stopped, and initiates a backward movement after predetermined time. A distance 1403 that is the shortest distance from the vehicles 801 and 802 adjacent to the parking position will be described later. As illustrated in FIG. 9(*b*), the control switching determination unit 5 selects the typical control setting, and thus the steering speed and the vehicle speed are set to be slow, and stopping time at the point B is set to be longer. According to this, it is possible to realize a control that does not give uncomfortable feeling to a passenger.

Description will be given of an example in which a driver gets out from the vehicle and the double parking is performed with reference to FIG. 10. The driver selects a parking space that is the point C in the parking space search mode, and gets out from the vehicle 800. In addition, the driver continuously presses the remote controller execution button 112 of the remote controller 111 on an outer side of the vehicle. Since the remote controller execution button 112 is pressed, the control switching determination unit 5 selects the remote control setting, and the route parameters for a remote use and the operation parameters for a remote use are respectively output to the parking route generation unit 2 and the drive system control unit 4.

Since the route parameters are changed to parameters for a remote use, a forward movement route 1601 becomes a trajectory along which the vehicle goes straight at a position beside the point C that is a parking position so as to improve environment recognition as illustrated in FIG. 10(*a*). A backward movement route 1602 becomes a trajectory in which a radius of curvature is small. A distance 1603 that is the shortest distance from the vehicles 801 and 801 adjacent to the parking position is longer than the distance 1403 in a case where the driver is present in the vehicle as illustrated in FIG. 9(*a*). That is, the closest distance from an obstacle can be secured to be long, and thus it is possible to raise security feeling.

Since the operation parameters are changed to parameters for a remote use, as illustrated in FIG. 10(*b*), the steering speed and the vehicle speed are set to be faster in comparison to the typical control setting, and stopping time at the point B is also shortened. As a result, time taken until parking is completed is shortened.

Description will be given of an example in which the parallel parking is performed with reference to FIGS. 11 and 12. FIG. 11 illustrates a case where a driver is in the vehicle, and the automatic parking is performed. FIG. 12 illustrates a case where the driver gets out from the vehicle and the automatic parking is performed. Drive from the points A to C is the same as in FIGS. 9 and 10, and thus description thereof will be omitted.

As can be seen from comparison between FIG. 11(*b*) and FIG. 12(*b*), even in the parallel parking, in a case where the remote controller execution button 112 is pressed, the operation parameters for a remote use are set, and thus the following advantage is provided. Specifically, the steering speed and the vehicle speed become faster in comparison to the typical control setting, and stopping time at the point B is also shortened. As a result, time taken until parking is completed is shortened.

As described above, when the typical control setting and the remote control setting are switched from each other, it is possible to complete relatively fast parking in the remote control setting without giving uncomfortable feeling to a passenger in the typical control setting.

Even in the parallel parking illustrated in FIGS. 11 and 12, the steering angle speed and the vehicle speed in the remote control setting are set to be faster in comparison to the typical control setting. Furthermore, in the examples in FIGS. 11 and 12, a forward movement route and a backward movement route from a parking initiation position to a parking completion position are illustrated as the same route between a typical use and a remote use in the drawing. In a case where an instruction of the automatic parking is given on an outer side of the vehicle, the forward movement route may be made to match a linear vehicle array direction to improve parking position search accuracy. In a case where the instruction of the automatic parking is given on an inner side of the vehicle, a line segment that connects the forward termination point B and the parking initiation viewpoint A may be inclined to the linear array direction for matching with the parallel parking operation without giving uncomfortable feeling to a passenger.

This operation example has been described with reference to the double parking vehicle in which the parking range line is provided. However, this operation example is also applicable to parking of the vehicle 800 in a garage in houses and the like.

(Operation Example of Detection of Parking Position and Avoidance of Obstacle)

Description will be given of an operation example related to detection of a parking position by the surrounding environment recognition unit 1, generation of a target route by the parking route generation unit 2, and detection and avoidance of collision by the collision prediction unit 3 with reference to FIGS. 13 to 17.

In the operation example illustrated in FIGS. 13 to 17, when an automatic parking operation of the vehicle 800 is initiated at once, automatic parking stoppage based on an operation by a driver does not occur. That is, when the driver presses the in-vehicle execution button 102 or the remote controller execution button 112, and the vehicle 800 initiates movement for automatic parking, the driver continuously presses the button until the automatic parking is completed.

FIG. 13 is a view illustrating an operation example of the surrounding environment recognition unit 1.

Figure 13A:
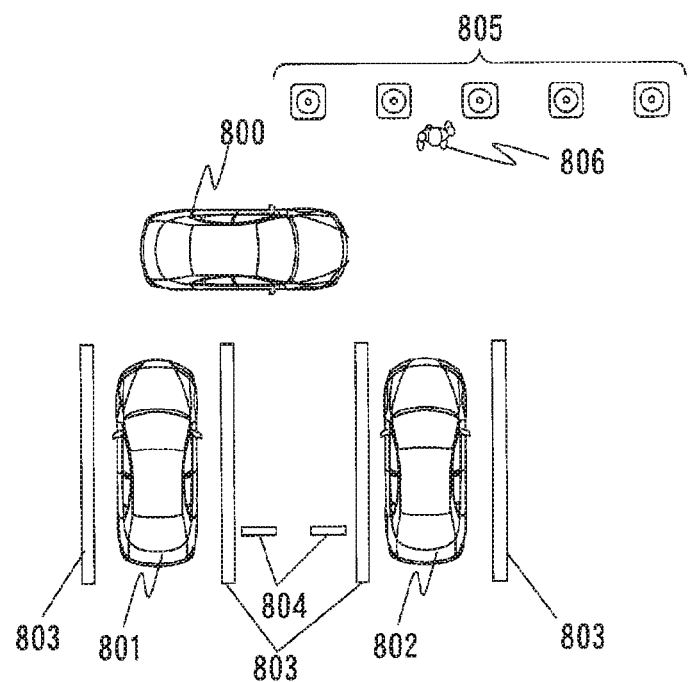
FIGS. 13A and 13B are views illustrating an operation example of a surrounding environment recognition unit.

FIG. 13(*a*) is an overhead image illustrating a surrounding environment of the vehicle 800. In the overhead image illustrated in FIG. 13(a), five pylons 805 exist on a left side (upper side in the drawing) of the travel direction of the vehicle 800, and a pedestrian 806 who approaches the vehicle 800 exists on a forward left side of the vehicle 800 in addition to a situation in the example illustrated in FIG. 9.

Figure 13B:
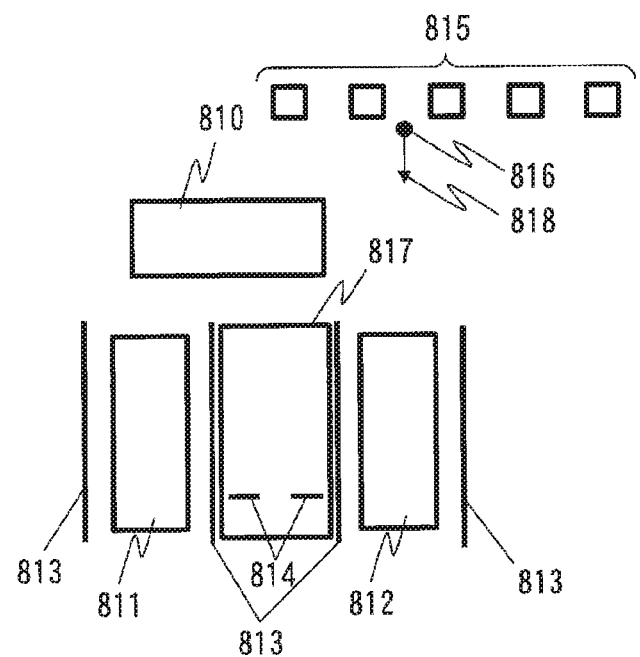

The surrounding environment recognition unit 1 detects the parked vehicles 801 and 802, the parking range line 803, the car stopper 804, the pylons 805, and the pedestrian 806 by using a known pattern matching method with respect to images from the cameras, and acquires information related to the positions. For example, as illustrated in FIG. 13(b), the surrounding environment recognition unit 1 recognizes the parked vehicles 801 and 802, the pylons 805 as rectangles 811 and 812, and a rectangle 815, and acquires coordinates of corners of the rectangles 811, 812, and 815. In addition, the surrounding environment recognition unit 1 recognizes the parking range line 803 and the car stopper 804 as a line segment 813 and a line segment 814, and acquires coordinates of both ends of the line segments 813 and 814. In addition, the surrounding environment recognition unit 1 recognizes the pedestrian 806 as a point 816, and acquires coordinates of the point 816.

The surrounding environment recognition unit 1 detects a movement direction of the pedestrian 806 from images corresponding to a plurality of ranges, and acquires a vector 818 indicating the movement direction. Information related to a shape of the vehicle 800 is set in advance in the surrounding environment recognition unit 1. For example, coordinates of corners of a rectangle 810 indicating the vehicle 800 are set in advance in the surrounding environment recognition unit 1. Furthermore, in the following description, the rectangle 810 indicating the vehicle 800 may be abbreviated as a vehicle 810, and the rectangles 811 and 812 indicating the parked vehicles 801 and 802 may be abbreviated as parked vehicles 811 and 812.

The surrounding environment recognition unit 1 recognizes a region in the following conditions as a parking-possible region, that is, a parking space. For example, when satisfying the entirety of a first condition in which the region is interposed between parking range lines 803, a second condition in which the car stopper 804 is detected, and a third condition in which the region is wider than the vehicle 800, a parking space 817 is detected. In FIG. 13(b), the parking space 817 is detected as a rectangular region. The surrounding environment recognition unit 1 calculates positional information of four corners in the region.

Figure 14:
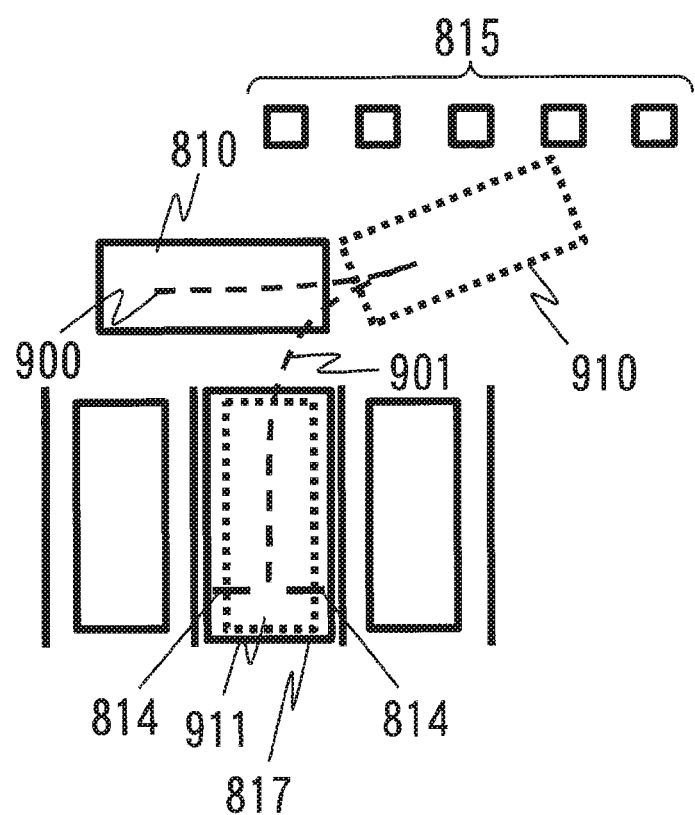
FIG. 14 is a view illustrating an operation example of a parking route generation unit.

FIG. 14 is a view illustrating a target parking position 911 that is set by the parking route generation unit 2 at the position of the vehicle 800 illustrated in FIG. 13(a), and a parking trajectory 901 up to the target parking position 911. The parking route generation unit 2 sets the target parking position 911 on an inner side of the parking space 817 illustrated in FIG. 13(b).

Since the vehicle 810 is backwardly parked at the target parking position 911, the parking route generation unit 2 sets a turnabout position 910 that is a forward/backward movement switching position. The parking route generation unit 2 sets a forward movement route 900 along which the vehicle 810 forwardly moves from a parking initiation position of the vehicle 810 to the turnabout position 910, and a backward movement route 901 along which the vehicle 810 backwardly moves from the turnabout position 910 to the target parking position 911 as a parking trajectory.

The forward movement route 900 illustrated in FIG. 14 includes a turning section for moving the vehicle 810 to a left-forward side, and a straight movement section in which the vehicle 810 goes straight from the parking initiation position until turning initiates. The parking route generation unit 2 expresses a route of the straight movement section as a straight line, and approximates the route of the turning section in a combination of a clothoid curve and a circular arc. The clothoid curve represents a trajectory of the vehicle 800 in a case where a speed of the vehicle 810 is set to be constant, and a steering angle of the vehicle 810 is changed at a constant angular velocity. The circular arc represents a trajectory of the vehicle 800 in a case where the vehicle 800 is driven in a state in which the speed of the vehicle 810 is set to be constant and the steering angle of the vehicle 810 is fixed to a predetermined value (excluding a steering angle at which the vehicle 800 goes straight).

The backward movement route 901 illustrated in FIG. 14 is expressed as a curve in a combination of a clothoid curve and a circular arc from the turnabout position 910 to the target parking position 911. An end point of the backward movement route 901 is set to a position immediately before a back wheel of the vehicle 810 comes into contact with the car stopper 814.

When the forward movement route 900 and the backward movement route 901 are calculated, the vehicle control device 100 initiates processing of the collision prediction unit 3. The collision prediction unit 3 determines whether or not the vehicle 800 collides with an obstacle when the vehicle 800 moves along the forward movement route 900 and the backward movement route 901. The collision prediction unit 3 calculates an estimation route that is estimated when the pedestrian 806 passes on the basis of a movement direction of a moving body that is detected by the surrounding environment recognition unit 1, for example, the movement direction of the pedestrian 806.

Figure 15:
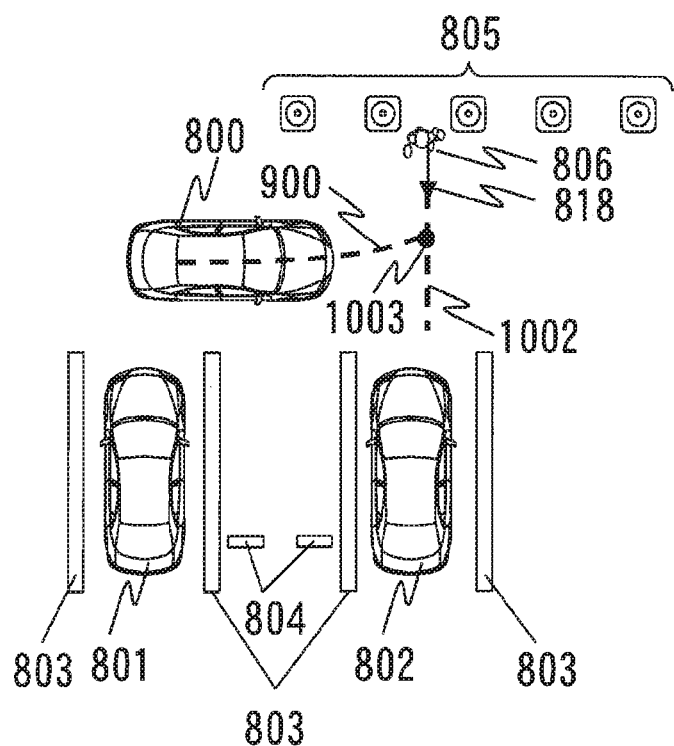
FIG. 15 is a view illustrating an operation example of a collision prediction unit.

FIG. 15 is a view illustrating an operation example of the collision prediction unit 3. FIG. 15 illustrates an example of an estimation route 1002 of the pedestrian 806 which is generated by the collision prediction unit 3. The estimation route 1002 represents an estimation route under the assumption that the pedestrian 806 goes straight as is in a direction indicated by the vector 818.

The collision prediction unit 3 calculates an intersection 1003 between the forward movement route 900 and the estimation route 1002 as a position at which the vehicle 800 may collide with an obstacle. The collision prediction unit 3 calculates time until each of the vehicle 800 and the pedestrian 806 reaches the intersection 1003 between the parking trajectory of the vehicle 800 and the estimation route of the pedestrian 806, and determines whether or not the vehicle 800 and the pedestrian 806 collide with each other from a positional relationship when the vehicle 800 and the pedestrian 806 reach the intersection 1003. With regard to the backward movement route 901, similarly, the collision prediction unit 3 calculates an intersection between the backward movement route 901 and the estimation route 1002, and calculates time until the each of the vehicle 800 and the pedestrian 806 reaches the intersection to determine whether or not the vehicle 800 and the pedestrian 806 collide with each other. As a predicted collision position, the collision prediction unit 3 outputs a position of an intersection, at which the vehicle 800 and an obstacle are determined to collide with each other, to the drive system control unit 4.

In a case where the collision prediction unit 3 determines that the vehicle 800 and an obstacle do not collide with each other, that is, in a case where the predicted collision position is not output, the drive system control unit 4 guides the vehicle 800 along the forward movement route 900 and the backward movement route 901 which are generated by the parking route generation unit 2. The drive system control unit 4 determines a target speed and a target steering angle in order for the vehicle 800 to move along the forward movement route 900 and the backward movement route 901. The drive system control unit 4 outputs the target steering angle to the steering device 105, and outputs the target speed to the drive device 106 and the braking device 107.

Figure 16A:
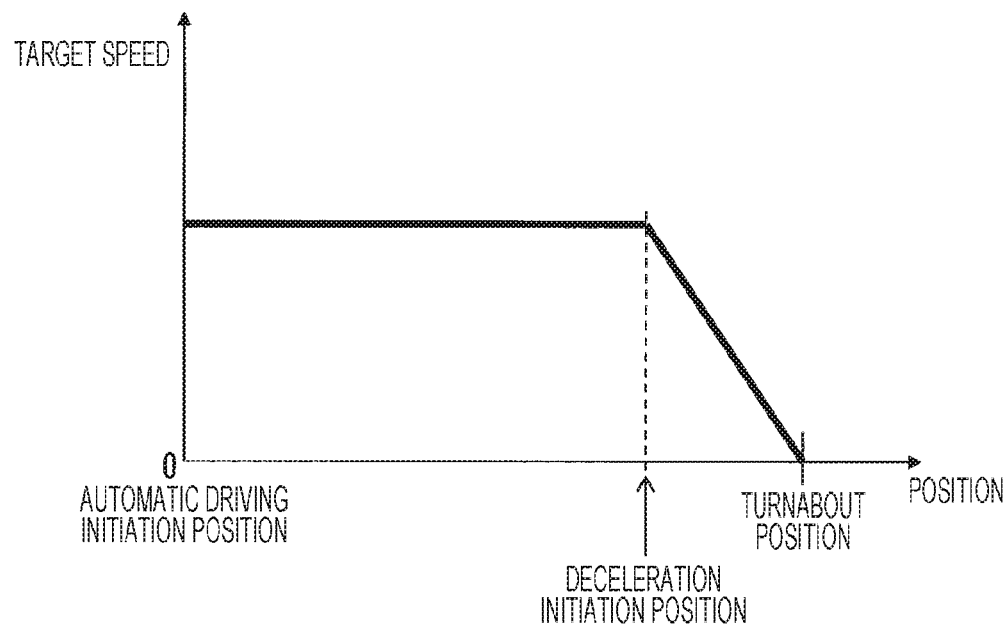
FIGS. 16A and 16B are views illustrating an example of a target speed control.
Figure 16B:
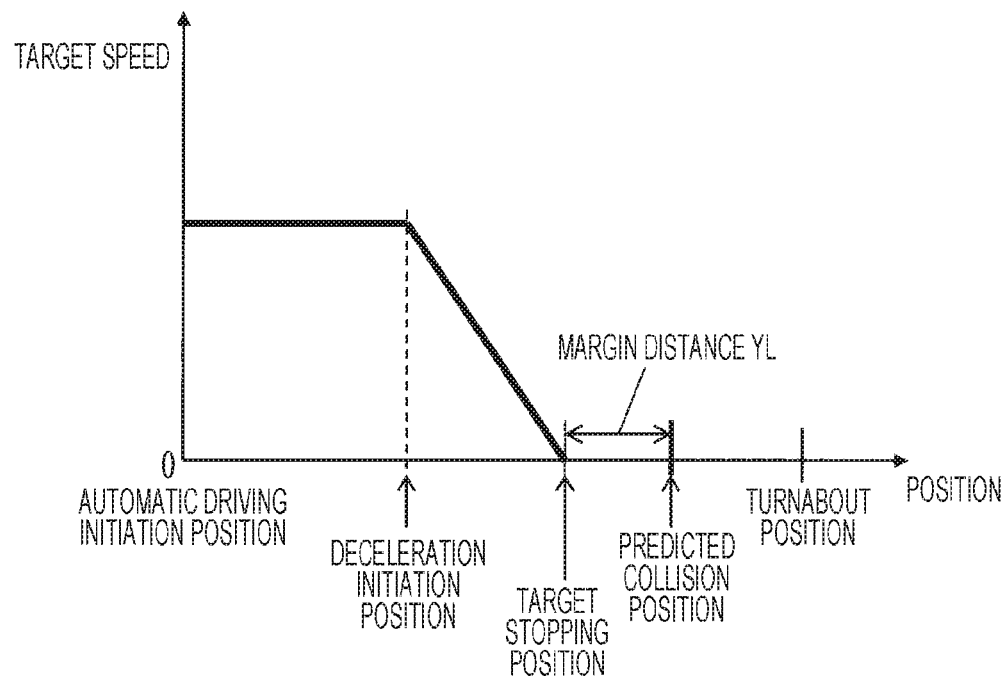

FIG. 16 is a view illustrating an example of a target speed control.

FIG. 16(*a*) is a view illustrating an example of the target speed control that is performed by the drive system control unit 4 in a case where the collision prediction unit 3 determines that the vehicle 800 and an obstacle do not collide on a forward movement route. In FIG. 16(*a*), the horizontal axis represents a position along the forward movement route 900, and the vertical axis represents a target speed at the position. A left end of the horizontal axis is a guide initiation position. The drive system control unit 4 gradually decreases the target speed from a deceleration initiation position before the turnabout position 910, and stops the vehicle 800 at the turnabout position 910.

In a case where the collision prediction unit 3 determines that the vehicle 800 collides with an obstacle on the forward movement route, the drive system control unit 4 stops the vehicle 800 before the collision position by a margin distance YL so as to avoid collision with the obstacle on the forward movement route 900.

FIG. 16(*b*) is a view illustrating an example of the target speed control that is performed by the drive system control unit 4 in a case where the collision prediction unit 3 determines that the vehicle 800 collides with an obstacle. In FIG. 16(*b*), the horizontal axis represents a position along the forward movement route 900, and the vertical axis represents a target speed at the position. A left end of the horizontal axis in FIG. 16(*b*) is a guide initiation position. In FIG. 16(*b*), the target speed of the vehicle 800 is decreased in order for the vehicle 800 to stop at a target stopping position before a predicted collision position with the obstacle by a margin distance YL.

Figure 17A:
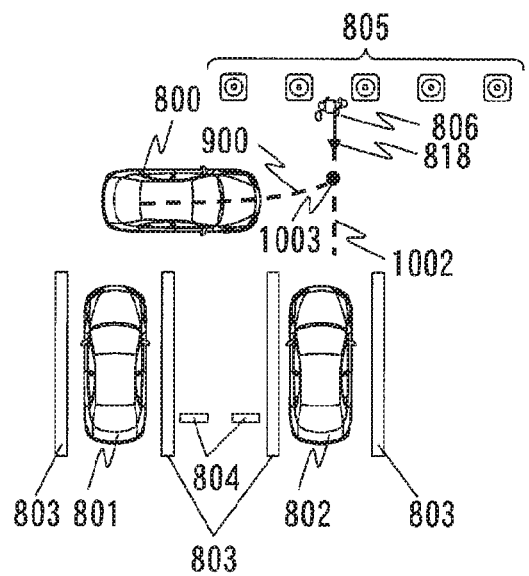
FIGS. 17A and 17B are overhead views illustrating an operation example of collision avoidance.
Figure 17B:
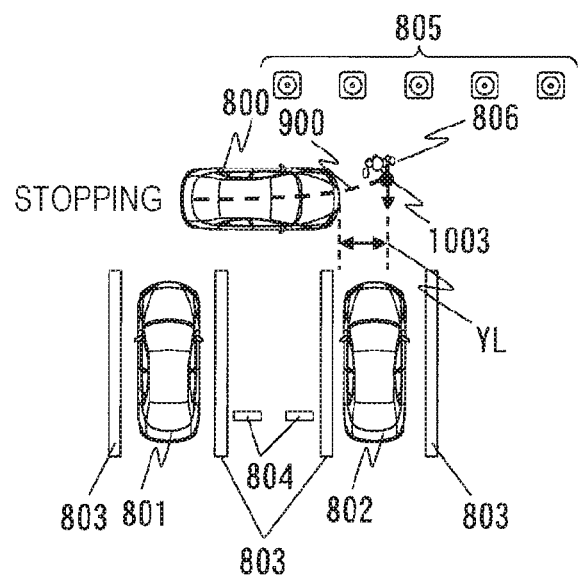

FIG. 17 is an overhead view illustrating an operation example of collision avoidance.

For example, as illustrated in FIG. 17(*a*), in a case where the vehicle 800 goes straight toward a forward side along the forward movement route 900, if collision with the pedestrian 806 at the intersection 1003 is predicted, as illustrated in FIG. 17(*b*), the target speed of the vehicle 800 is decreased in order for the vehicle 800 to stop at a position on the forward movement route 900 before the intersection 1003 by the margin distance YL.

Here, it is preferable that the margin distance YL is allowed to vary on the basis of a travel direction of the vehicle 800 at the predicted collision position, and is set to be great in a situation in which a driver performs driving carefully. That is, in the situation in which the driver performs driving carefully, for example, in backward movement, if the vehicle 800 stops further before the predicted collision position in comparison to forward movement, uncomfortable feeling is not given to the driver.

Then, the collision prediction unit 3 repetitively determines whether or not collision with an obstacle occurs, and in a case where it is determined that the collision with the obstacle including the pedestrian 806 does not occur, the vehicle 800 starts automatic parking again.

According to the above-described embodiment, the following operational effects are obtained.

(1) The vehicle control device 100 includes the surrounding environment recognition unit 1 that recognizes a surrounding environment of the vehicle 800, and a parking route generation unit 2 that generates a travel route to a target parking position that is determined on the basis of the surrounding environment that is recognized. The vehicle control device 100 further includes a signal input unit, that is, the interface 9 to which a parking command signal generated by pressing the in-vehicle execution button 102 or the remote controller execution button 112 is input. The vehicle control device 100 further includes a travel control unit, that is, the drive system control unit 4 and the control switching determination unit 5 which allows the vehicle 800 to travel to a target parking position along the travel route on the basis of the parking command signal that is input.

The vehicle control device 100 drives a vehicle so that the vehicle performs automatic parking travel to the target parking position in a behavior different between a case where the input parking command signal is a first parking command signal and a case where the input parking command signal is a second parking command signal.

In the first embodiment, the travel control unit, that is, the drive system control unit 4 and the control switching determination unit 5 changes the operation parameters on the basis of a signal that is input to the interface 9. In addition, the parking route generation unit 2 and the control switching determination unit 5 change the route parameters on the basis of the signal that is input to the interface 9.

Since the vehicle control device 100 has the above-described configuration, it is possible to automatically park the vehicle 800 by a behavior in correspondence with a situation.

(2) The vehicle control device 100 recognizes a parking command signal, which is input from an outer side of the vehicle by the remote controller 111, as the first parking command signal because the parking command signal is input through the interface 9*c*. The vehicle control device 100 recognizes a parking command signal, which is input from an inner side of the vehicle, as the second parking command signal because the parking command signal is input through the interface 9*a*. Therefore, the behavior of the vehicle 800 can be set to be different on the basis of a situation in which the parking command signal is input from either the inner side or the outer side of the vehicle.

(3) When the signal recognized as the first parking command signal is input, the travel control unit, that is, the drive system control unit 4 and the control switching determination unit 5 controls the behavior of the vehicle 800 so that time necessary for parking completion is further shortened in comparison to a case where the signal recognized as the second parking command signal is input.

Accordingly, in a case where the remote controller execution button 112 is pressed, it is possible to quickly complete automatic parking.

(4) The travel control unit, that is, the drive system control unit 4 and the control switching determination unit 5 controls the vehicle so that at least one of a steering speed in stationary steering, a speed, an acceleration, stopping time in direction switching, which are operation parameters, becomes different on the basis of the signal that is input to the signal input unit, that is, the interface 9.

That is, when the first parking command signal is input to the interface 9, the control switching determination unit 5 changes the operation parameters from the typical control setting to the remote control setting. According to this, the behavior of the vehicle 800 that is controlled by the drive system control unit 4 is changed to correspond to at least one of (a) to (d) to be described below. (a) The steering speed in the stationary steering is set to a high speed, (b) the vehicle speed is set to a high speed, (c) the acceleration is set to be large, and (d) the stopping time in the direction switching is set to be short. It is possible to quickly complete the automatic parking in comparison to the typical control setting through change of at least one of (a) to (d). As the number of changed items increases, the effect is great. In addition, in a case of the entirety of (a) to (d) are changed, the effect becomes the greatest.

An example of specific values of the parameters which are changed is as follows. The steering speed is changed from 180°/second as a setting for a typical use to 500°/second as a setting for a remote use. The vehicle speed is changed from 3 km/h in forward movement and 2 km/h in backward movement as a setting for a typical use to 5 km/h both in forward movement and backward movement as a setting for a remote use. The acceleration is changed from 0.5 m/s² as a setting for a typical use to 2.0 m/s² as a setting for a remote use. The forward/backward movement switching time is changed from 2 seconds as a setting for a typical use to 0.5 seconds as a setting for a remote use.

(5) The parking route generation unit 2 generates a travel route to a determined parking position which is different between a case where the parking command signal input to the signal input unit, that is, the interface 9 is the first parking command signal, and a case where the parking command signal is the second parking command signal.

Accordingly, the vehicle control device 100 can automatically parks the vehicle 800 by a travel route in correspondence with a situation.

(6) When a signal recognized as the first parking command signal is input, the parking route generation unit 2 controls a trajectory of a vehicle so that the closest distance between the vehicle and an obstacle of the periphery is further lengthened in comparison to a case where a signal recognized as the second parking command signal is input.

Accordingly, even in a case where a driver cannot confirm the obstacle and the vehicle 800 with eyes, it is possible to raise security feeling.

(7) When the parking command signal is input to the signal input unit, that is, the interface 9, the travel control unit, that is, the drive system control unit 4 drives the vehicle 800 to perform automatic parking travel, and when the parking command signal is not input to the signal input unit, the drive system control unit 4 stops the automatic parking travel. That is, when the in-vehicle execution button 102 or the remote controller execution button 112 is pressed, the drive system control unit 4 drives the vehicle to perform automatic parking travel. When any button is not pressed, the drive system control unit 4 stops the automatic parking travel.

Accordingly, drive of the vehicle 800 is terminated only through separation of a hand from a button that is pressed by the driver during automatic parking, and thus it is possible to quickly stop the vehicle 800.

(8) The environmental information acquisition device 101 includes at least two image capturing units, that is, two in-vehicle cameras which are fixed to the vehicle 800 and photograph two left and right directions of the vehicle. The environment recognition units, that is, the surrounding environment recognition unit 1 receives an image capturing signal from the environmental information acquisition device 101 and recognizes the surrounding environment. When the first parking command signal is input, the parking route generation unit 2 generates a travel route including a route in which the image capturing units go straight on a lateral side of the parking position while photographing a parking position.

Accordingly, in a case where the remote controller execution button 112 is pressed, it is possible to perform photographing in a posture in which the in-vehicle cameras rightly face the parking space so that the surrounding environment recognition unit 1 can recognize the parking space with accuracy. According to this, this configuration is useful for calculation of a travel route of the vehicle 800 in which the closest distance from a peripheral obstacle is lengthened.

As described above, the route parameters includes three parameters such as the uncomfortable feeling reducing parameter, the obstacle shortest distance parameter, and the environment recognition parameter. In the typical control setting and the remote control setting, when at least one parameter among the three parameters is changed, an effect of each of the parameters is obtained. As the number of changed parameters increases, the effect also increases.

In addition, in the typical control setting and the remote control setting, in a case where both of the operation parameters and the route parameters are changed, and the entirety of constituent elements of the respective parameters are changed, the most effective result is obtained.

Modification Example 1

In the above-described embodiment, in the typical control setting and the remote control setting, both sides of the operation parameters and the route parameters are changed, but only one side may be changed. In addition, only a part of the operation parameters may be changed, or only a part of the route parameters may be changed. A driver may select a parameter to be changed.

FIG. 17 illustrates an operation example of the double parking in a case where only the typical control setting and the operation parameters are changed in the remote control setting. The operation example illustrated in FIG. 18 corresponds to the operation example illustrated in FIG. 9 in which the typical control setting is used in the operation example of the double parking in the first embodiment. That is, in the operation examples in FIGS. 17 and 9, the route parameters are the same as each other, and only the operation parameters are different from each other. Hereinafter, the two operation examples will be compared with each other.

Figure 18A:
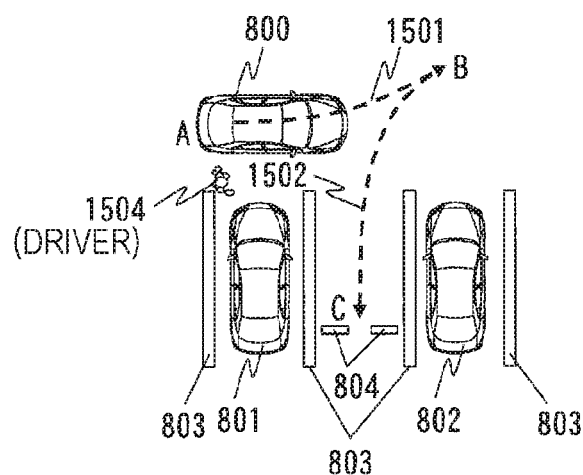
FIGS. 18A and 18B are views illustrating an operation example of double parking in remote control setting according to Modification Example 1.
Figure 18B:
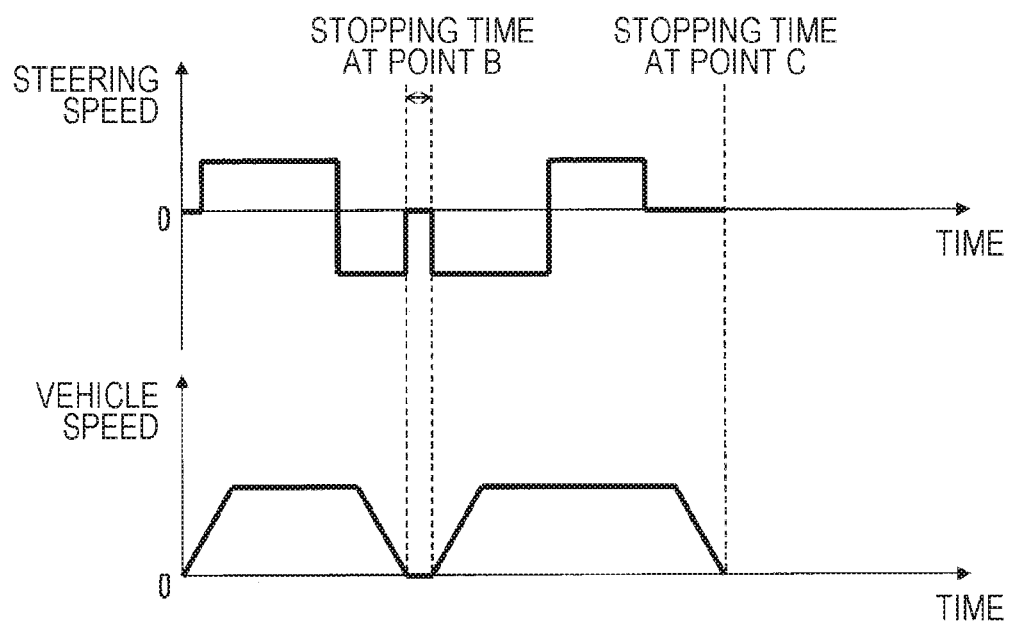

The route parameters in the two operation examples are the same as each other, and thus target trajectories (1501 and 1502) illustrated in FIG. 18(a) are the same as the target trajectories (1401 and 1402) illustrated in FIG. 9(a). However, the operation parameters are parameters for a remote use in the example of FIG. 18, and are parameters for a typical use in the example of FIG. 9. Accordingly, as illustrated in FIG. 18(b), the steering speed and the vehicle speed are set to be greater and the stopping time at the point B is further shortened in comparison to the typical use illustrated in FIG. 9(b). As a result, time taken until parking is completed is shortened.

Accordingly, it is possible to shorten stand-by time of a driver who waits completion of automatic parking without changing the target trajectories.

According to Modification Example 1, it is possible to change parameters which are set to be different between the typical control setting and the remote control setting in accordance with preference of a driver.

Modification Example 2

In the above-described embodiment, only in a case where the in-vehicle execution button 102 or the remote controller execution button 112 is continuously pressed, the vehicle 800 can be driven for automatic parking. That is, when a hand is separated from the button during movement to a parking position by an automatic parking control, the target speed is set to zero, and thus the vehicle 800 is controlled to stop (step S516 in FIG. 6). However, the vehicle 800 may move to the parking position when the in-vehicle execution button 102 or the remote controller execution button 112 is pressed once.

In this case, when the in-vehicle execution button 102, the remote controller execution button 112, or the search initiation button 103 is pressed again during movement of the vehicle 800 by the automatic parking control, the target speed may be set to zero. In addition, the communication device 104 may periodically perform a communication with the remote controller 111, and the target speed may be set to zero at a point of time at which the communication becomes impossible. That is, the vehicle control device 100 confirms that possibility of the communication with the remote controller 111 at a short time period at least during execution of the automatic parking control. In addition, when detecting impossibility of the communication, the vehicle control device 100 sets the target speed to zero similar to the case where the remote controller execution button 112 is pressed again, and stops the vehicle 800.

According to Modification Example 2, it is not necessary to continuously press the in-vehicle execution button 102 or the remote controller execution button 112 for automatic parking, and thus it is possible to simplify an operation by a driver. In addition, the vehicle 800 is stopped when any button is pressed during execution of the automatic parking, safety is also taken into consideration.

Modification Example 3

In the above-described embodiment, the environmental information acquisition device 101 is constituted by the four in-vehicle cameras, but the configuration of the environmental information acquisition device 101 is not limited thereto. The environmental information acquisition device 101 may be constituted by a radar that measures a distance from an object by using a millimeter wave or a laser, a sonar that measures a distance from an object by using ultrasonic waves, and the like.

Modification Example 4

In the above-described embodiment, the search initiation button 103 and the in-vehicle execution button 102 are physical buttons, but the configuration of the search initiation button 103 and the in-vehicle execution button 102 is not limited thereto. The display device 110 may be set as a touch panel type display, and buttons displayed on the display device 110 may be set as the search initiation button 103 and the in-vehicle execution button 102.

Modification Example 5

In the above-described embodiment, the entirety of the surrounding environment recognition unit 1, the parking route generation unit 2, the collision prediction unit 3, the drive system control unit 4, the control switching determination unit 5, and the HMI control unit 6, which express the function of the vehicle control device 100 as functional blocks, are realized by a software program. However, a part thereof may be realized by a hardware circuit.

Modification Example 6

In the above-described embodiment, the remote controller 111 is exclusive hardware, but the configuration of the remote controller 111 is not limited thereto. Software may be installed in a terminal such as a portable telephone to function as the remote controller 111. In addition, the remote controller execution button 112 may be a physical button provided to the terminal. In a case where the terminal includes a touch panel type display, a specific region displayed on the display may be set to the remote controller execution button 112.

Modification Example 7

In the typical control setting and the remote control setting, only the operation parameters may be set to be different, and re-calculation of a target trajectory in an automatic parking mode may not be performed. That is, the vehicle control device 100 controls the vehicle 800 in the automatic parking mode so as to conform to a target trajectory that is calculated in the parking space search mode before being changed to the automatic parking mode. Even in this case, the control switching determination unit 5 changes the operation parameters in accordance with pressing of either the in-vehicle execution button 102 or the remote controller execution button 112.

Modification Example 8

In the above-described embodiment, in accordance with a signal input to either the interface 9c or the interface 9a, the control switching determination unit 5 determines that the signal is input from the remote controller 111 on an outer side of the vehicle, or the signal is input from an inner side of the vehicle. That is, in the above-described embodiment, the control switching determination unit 5 recognizes the first parking command signal and the second parking command signal.

However, the interface 9c and the interface 9a may respectively output a signal indicating the signal input from the remote controller 111 on the outer side of the vehicle, and a signal indicating the signal input from the inner side of the vehicle to the control switching determination unit 5. That is, the interface 9 may perform recognition of the first parking command signal and the second parking command signal.

Modification Example 9

In the above-described embodiment, description has been given of the function of the vehicle control device 100 which is realized by the software program by dividing the function into six functional blocks including the surrounding environment recognition unit 1, the parking route generation unit 2, the collision prediction unit 3, the drive system control unit 4, the control switching determination unit 5, and the HMI control unit 6. However, sharing of the function is not limited thereto. The vehicle control device 100 may have the functions overall, or functions for every function block may partially overlap each other.

For example, the parking route generation unit 2 and the drive system control unit 4 may have the function of the control switching determination unit 5, the parking route generation unit 2 and the drive system control unit 4 may perform recognition of the first parking command signal and the second parking command signal to switch operation parameters and trajectory parameters.

Second Embodiment

Description will be given of a second embodiment of the vehicle control device according to the invention with reference to FIGS. 19 and 20. In the following description, the same reference numeral will be given to the same constituent element as in the first embodiment, and description will be mainly given to a point of difference. A configuration that is not particularly described is the same as in the first embodiment. This embodiment is different from the first embodiment in that even when the remote controller execution button is pressed, if a passenger remains in the vehicle, the same processing as in a case where the in-vehicle execution button is pressed is performed.

(Configuration)

Figure 19:
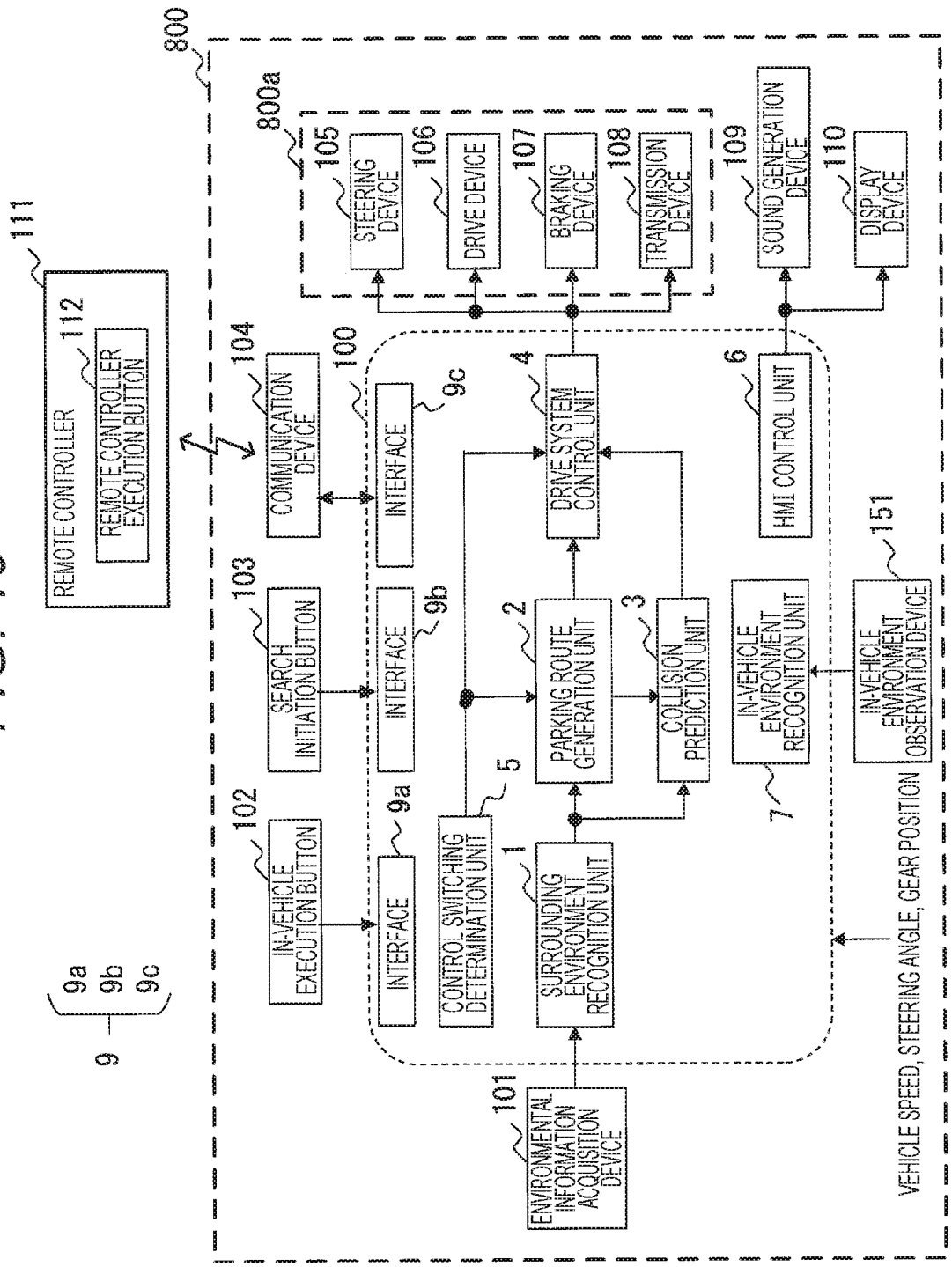
FIG. 19 is a block diagram illustrating a configuration of a vehicle according to a second embodiment.

FIG. 19 is a block diagram illustrating a configuration of the vehicle 800 according to the second embodiment. This configuration is different from the configuration according to the first embodiment mainly in that the vehicle 800 further includes an in-vehicle environment observation device 151, and the vehicle control device 100 further includes an in-vehicle environment recognition unit 7.

The in-vehicle environment observation device 151 is a load cell that is used as a seating sensor that is provided under respective seats, and outputs a voltage corresponding to a load applied thereto to the in-vehicle environment recognition unit 7. Furthermore, the in-vehicle environment observation device 151 may be provided with a camera or a microphone instead of the load cell.

The in-vehicle environment recognition unit 7 determines whether or not a driver or a passenger on another seat is present through determination on whether or not a magnitude of a voltage, which is input from the in-vehicle environment observation device 151, is equal to or greater than a predetermined value. The in-vehicle environment recognition unit 7 outputs the determination result, that is, presence or absence of the passenger to the control switching determination unit 5.

(Automatic Parking Mode)

Among the four modes provided to the vehicle control device 100, the behavior of the automatic parking mode is different from that in the first embodiment. In the first embodiment, the operation parameters and the route parameters are switched through determination on only which button of the in-vehicle execution button 102 or the remote controller execution button 112 is pressed. However, in this embodiment, the remote control setting is performed only in a case where the remote controller execution button 112 is pressed and a passenger is not present. Even when the remote controller execution button 112 is pressed, if the passenger is present, the typical control setting is performed.

That is, the control switching determination unit 5 recognizes a signal, which is input to the interface 9, as either the first parking command signal or the second parking command signal on the basis of the signal that is input to the interface 9 and the determination result of the in-vehicle environment recognition unit 7.

Specific processing will be described with reference to a flowchart.

Figure 20:
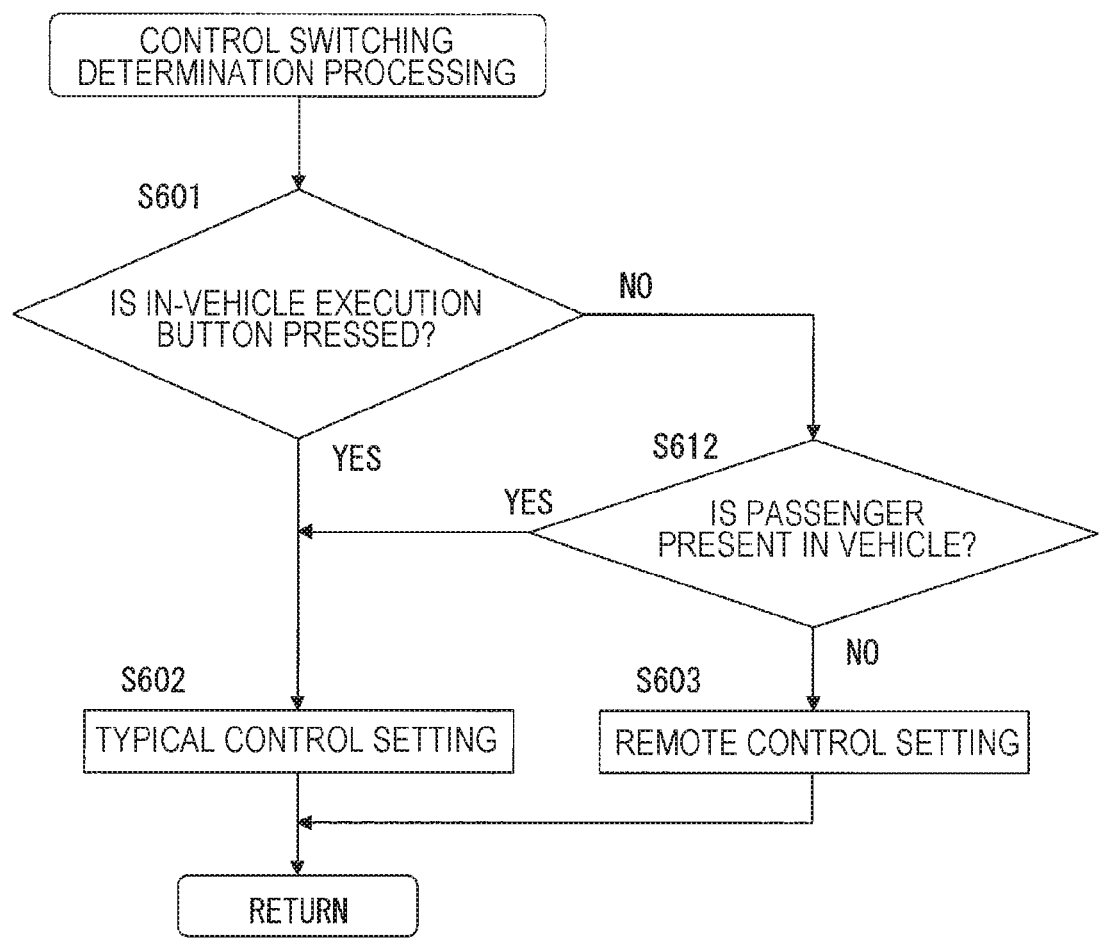
FIG. 20 is a subroutine illustrating control switching determination processing according to the second embodiment.

Processing illustrated in a flowchart of FIG. 20 is control switching determination processing that is executed as step S506 in FIG. 6 instead of the processing illustrated in the flowchart of FIG. 7 in the first embodiment. An execution subject of respective steps to be described below is the CPU of the vehicle control device 100 similar to the first embodiment. The control switching determination processing starts from step S601.

In step S601, it is determined whether or not the in-vehicle execution button 102 is pressed. In a case where it is determined that the in-vehicle execution button 102 is pressed, it proceeds to step S602. In a case where the in-vehicle execution button 102 is not pressed, that is, it is determined that the remote controller execution button 112 is pressed, it proceeds to step S612.

In step S602, the operation parameters and the route parameters are set to parameters for a typical use, the subroutine illustrated in FIG. 6 is terminated, and it returns to FIG. 5.

In step S612, it is determined whether or not a passenger is present in the vehicle by using the in-vehicle environment recognition unit 7. In a case where it is determined that a passenger is present in the vehicle, it proceeds to step S602. In a case where it is determined that a passenger is not present in the vehicle, that is, a person is not present in the vehicle, it proceeds to step S603.

In step S603, the operation parameters and the route parameters are set to parameters for a remote use, the subroutine illustrated in FIG. 20 is terminated, and it returns to FIG. 5.

In the vehicle control device having the above-described configuration according to the second embodiment, even in a case where a driver operates the remote controller 111 on an inner side of vehicle or even in a case where the remote controller 111 is operated on an outer side of the vehicle although a passenger remains in the vehicle, automatic parking is executed by using the operation parameters by the typical control setting. Accordingly, the passenger in the vehicle does not have uncomfortable feeling with respect to a behavior of the vehicle in the automatic parking travel.

Modification Example of Second Embodiment

In the above-described second embodiment, determination is made on using of either the typical control setting or the remote control setting on the basis of a pressed button and presence or absence of a passenger in a vehicle. However, determination may be made on using of either the typical control setting or the remote control setting on the basis of only presence or absence of the passenger in the vehicle.

That is, the control switching determination unit 5 may recognize a signal that is input to the interface 9 as either the first parking command signal or the second parking command signal on the basis of only the determination result of the in-vehicle environment recognition unit 7.

Figure 21:
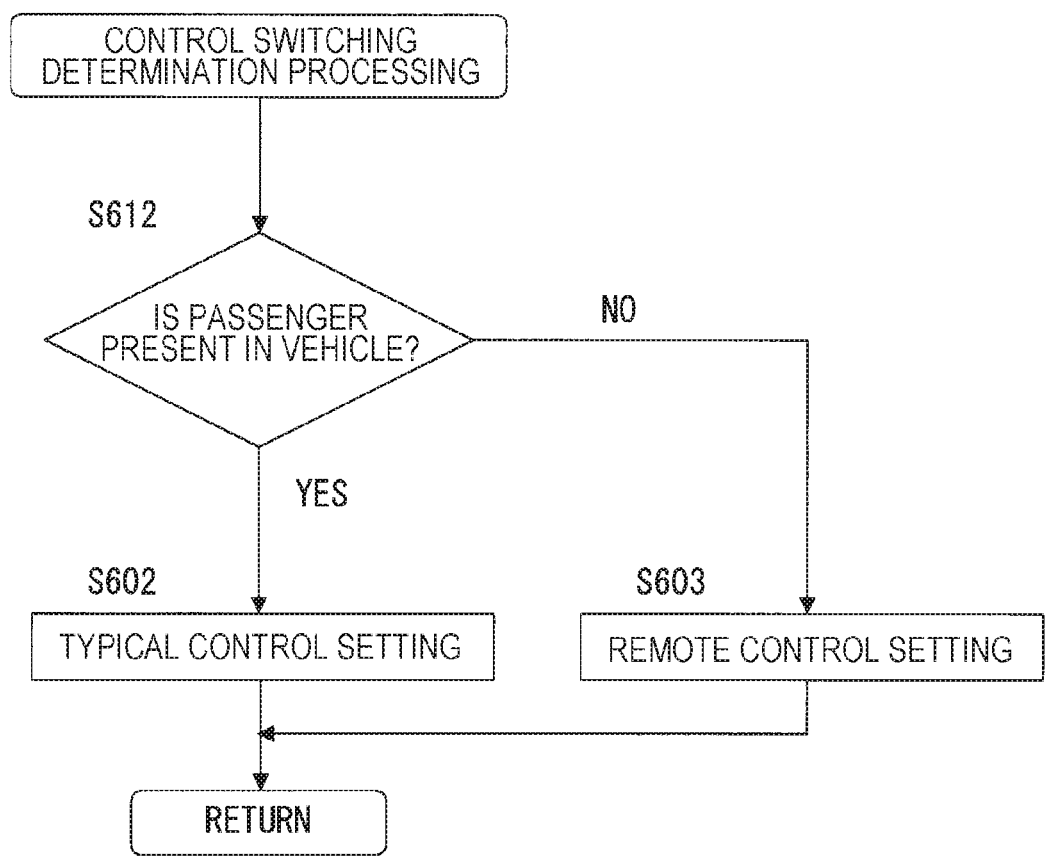
FIG. 21 is a subroutine illustrating control switching determination processing according to a modification example of the second embodiment.

Processing illustrated in a flowchart of FIG. 21 is control switching determination processing that is executed as step S506 in FIG. 6 instead of processing illustrated in the flowchart of FIG. 7 in the first embodiment. An execution subject of respective steps to be described below is the CPU of the vehicle control device 100 similar to the first embodiment. The control switching determination processing starts from step S612.

In step S612, it is determined whether or not a passenger is present in a vehicle by using the in-vehicle environment recognition unit 7. In a case where it is determined that a passenger is present in the vehicle, it proceeds to step S602. In a case where it is determined that a passenger is not present in the vehicle, that is, a person is not present in the vehicle, it proceeds to step S603.

In step S602, the operation parameters and the route parameters are set to parameters for a typical use, the subroutine illustrated in FIG. 6 is terminated, and it returns to FIG. 5.

In step S603, the operation parameters and the route parameters are set to parameters for a remote use, the subroutine illustrated in FIG. 20 is terminated, and it returns to FIG. 5.

In this manner, in the present modification example, the behavior of the vehicle 800 in the automatic parking is determined on the basis of presence or absence of a passenger in the vehicle. In other words, the drive system control unit 4 does not discriminate a signal that is generated by pressing the in-vehicle execution button 102 and a signal that is generated by pressing the remote controller execution button 112, and uses the signals as a signal for determination on whether or not the automatic parking is to be driven. That is, even when receiving any signal, the vehicle control device 100 drives the vehicle 800 in a behavior that is determined by a determination result in accordance with a signal from the in-vehicle environment recognition unit 7. When signal reception is stopped or when the vehicle 800 reaches a parking position, the vehicle control device 100 stops the vehicle 800.

According to this modification example, the following operational effect is obtained.

(1) The vehicle control device 100 includes a passenger recognition unit that recognizes presence or absence of a passenger in the vehicle 800, that is, the in-vehicle environment recognition unit 7. When the in-vehicle environment recognition unit 7 determines that a passenger is not present, the vehicle control device 100 recognizes a parking command signal as the first parking command signal. When the in-vehicle environment recognition unit 7 determines that a passenger is present, the vehicle control device 100 recognizes the parking command signal as the second parking command signal.

Accordingly, it is possible to change a behavior of the vehicle 800 when performing the automatic parking in correspondence with presence or absence of the passenger in the vehicle 800.

Third Embodiment

Description will be given of a third embodiment of the vehicle control device according to the invention. In the following description, the same reference numeral will be given to the same constituent element as in the first embodiment, and description will be mainly given to a point of difference. A configuration that is not particularly described is the same as in the first embodiment. This embodiment is different from the first embodiment in that the remote controller 111 also includes a button having the same function as that of the in-vehicle execution button 102. That is, the vehicle control device according to the third embodiment can make a command for automatic parking by the operation parameters in accordance with the typical control setting on an outer side of the vehicle.

(Configuration)

The third embodiment is different from the first embodiment mainly in the configuration of the remote controller 111 and the configuration of the interface 9c.

Figure 22:
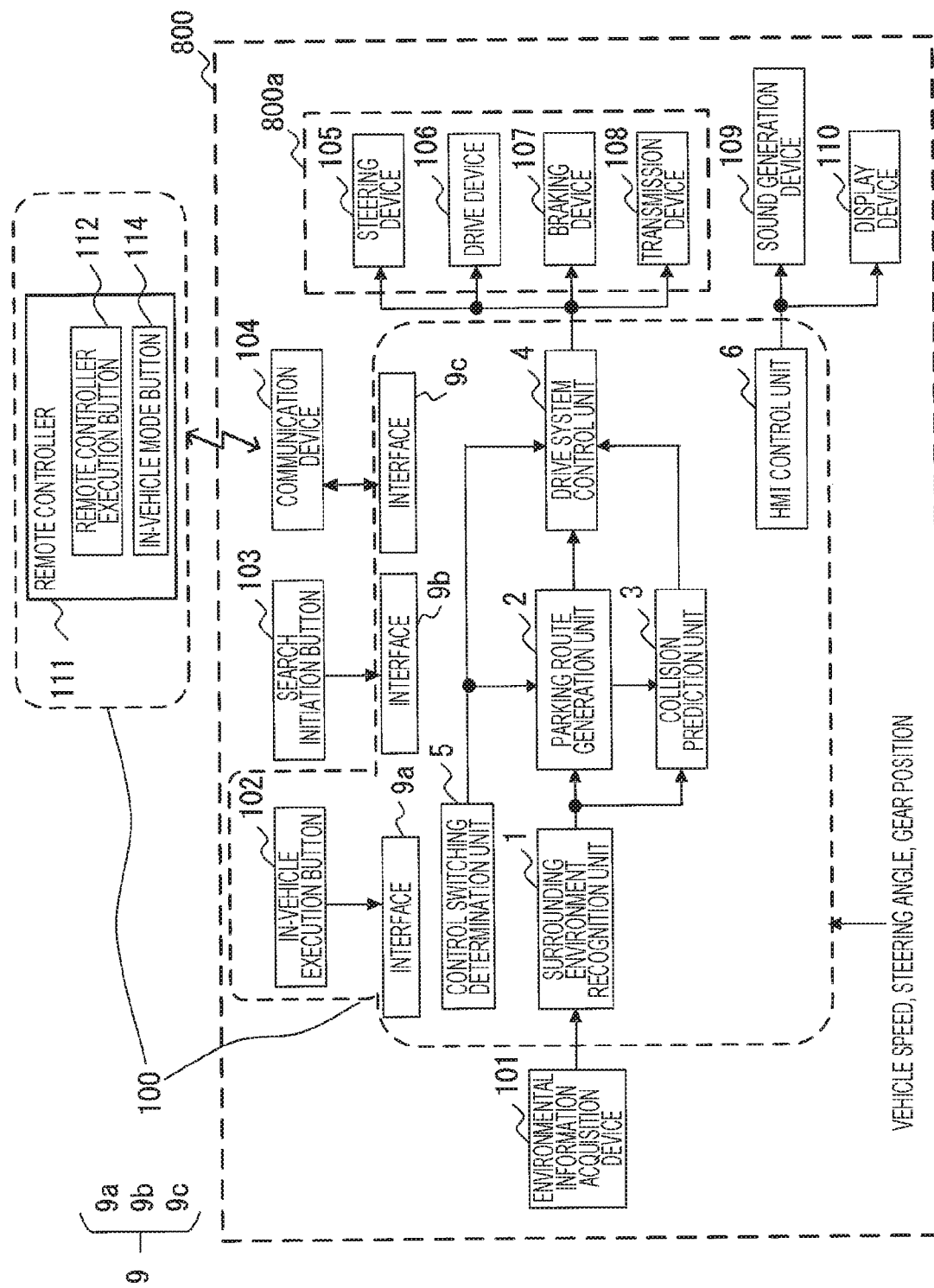
FIG. 22 is a block diagram illustrating a configuration of a vehicle according to a third embodiment.

FIG. 22 is a block diagram illustrating a configuration of the vehicle 800 according to the third embodiment.

The remote controller 111 includes an in-vehicle mode button 114 in addition to the remote controller execution button 112. The remote controller 111 transmits a signal that is different depending on a pressed button, and the communication device 104 outputs a signal that is different depending on the pressed button to the interface 9c. For example, a voltage value that is input to the interface 9c, or voltage variation frequency or pattern is different depending on which button is pressed.

The interface 9c determines which button is pressed in accordance with a signal that is input.

When a signal corresponding to the in-vehicle mode button of the remote controller 111 is input to the interface 9c, the vehicle control device 100 performs the automatic parking operation with the same operation parameters as in a case where the in-vehicle execution button 102 is pressed.

According to the above-described third embodiment, the following operational effect is obtained.

(1) The vehicle control device 100 includes an in-vehicle output unit, that is, the in-vehicle execution button 102 that is provided on an inner side of the vehicle 800 and outputs the second parking command signal to a signal input unit, that is, the interface 9a. The vehicle control device 100 includes an outside-of-vehicle output unit, that is, the remote controller 111 that outputs either the first parking command signal or the second parking command signal to a signal input unit, that is, the interface 9c from an outer side of the vehicle 800.

Accordingly, in automatic parking using the remote controller 111, a driver can freely select a behavior of the vehicle 800. For example, in a case where focus is given to quietness such as a case where automatic parking is performed in a residential area at night, when the driver presses the in-vehicle mode button 114, an acceleration is small, and thus it is possible to perform automatic parking by the typical control setting with a faint sound.

Modification Example of Third Embodiment

The vehicle control device 100 may include a mode selection switch that selects the typical control setting or the remote control setting, and a behavior of the vehicle 800 in the automatic parking may be determined in accordance with selection of the mode selection switch regardless of whether or not a pressed button is either the in-vehicle execution button 102 or the remote controller execution button 112. That is, when the in-vehicle execution button 102 and the remote controller execution button 112 outputs a common signal, and the automatic parking command signal is input, the behavior of the vehicle is determined on the basis of a mode that is selected by the mode selection switch.

The mode selection switch may be provided to the remote controller 111.

Fourth Embodiment

Description will be given of a fourth embodiment of the vehicle control device according to the invention. In the following description, the same reference numeral will be given to the same constituent element as in the first embodiment, and description will be mainly given to a point of difference. A configuration that is not particularly described is the same as in the first embodiment. This embodiment is different from the first embodiment in that even though an obstacle is detected during automatic parking and the obstacle is not detected after a vehicle stops, if a button is not pressed again, the automatic parking does not start again.

(Configuration)

This embodiment is different from the first embodiment mainly in that the vehicle control device 100 includes a re-driving suppression unit, and when the re-driving suppression unit receives a signal to be described later, the drive system control unit 4 does not drive a vehicle.

Figure 23:
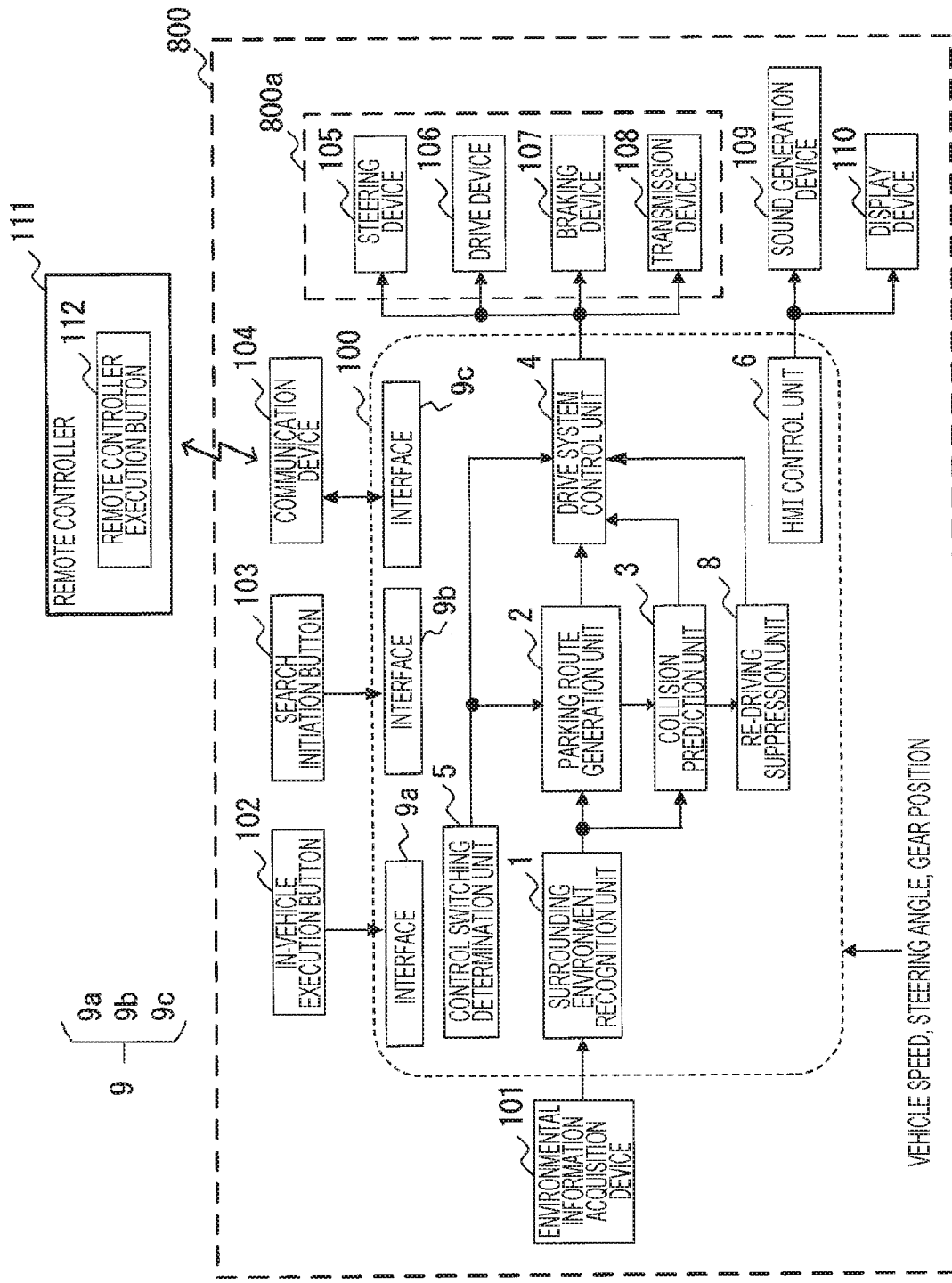
FIG. 23 is a block diagram illustrating a configuration of a vehicle according to a fourth embodiment.

FIG. 23 is a block diagram illustrating a configuration of the vehicle 800 according to the fourth embodiment. The vehicle control device 100 further includes a re-driving suppression unit 8 in addition to the configuration of the first embodiment.

The re-driving suppression unit 8 receives a determination result on whether or not collision occurs from the collision prediction unit 3, receives a parking command signal from the interface 9, performs the following processing, and outputs a drive prohibition command to the drive system control unit 4. The re-driving suppression unit 8 reserves a collision restarting flag in the vehicle control device 100 so as to manage a state. The collision restarting flag is OFF in an initial state. That is, when the parking space search mode is changed to the automatic parking mode, the collision restarting flag is set to OFF.

The drive system control unit 4 does not drive the travel drive system 800*a* while the re-driving suppression unit 8 outputs a drive prohibition command. When the re-driving suppression unit 8 stops outputting of the drive prohibition command, the drive system control unit 4 drives the travel drive system 800*a* in accordance with automatic parking processing described in the first embodiment.

(Re-Driving Suppression Processing)

The re-driving suppression unit 8 always performs re-driving suppression processing to be described below.

Figure 24:
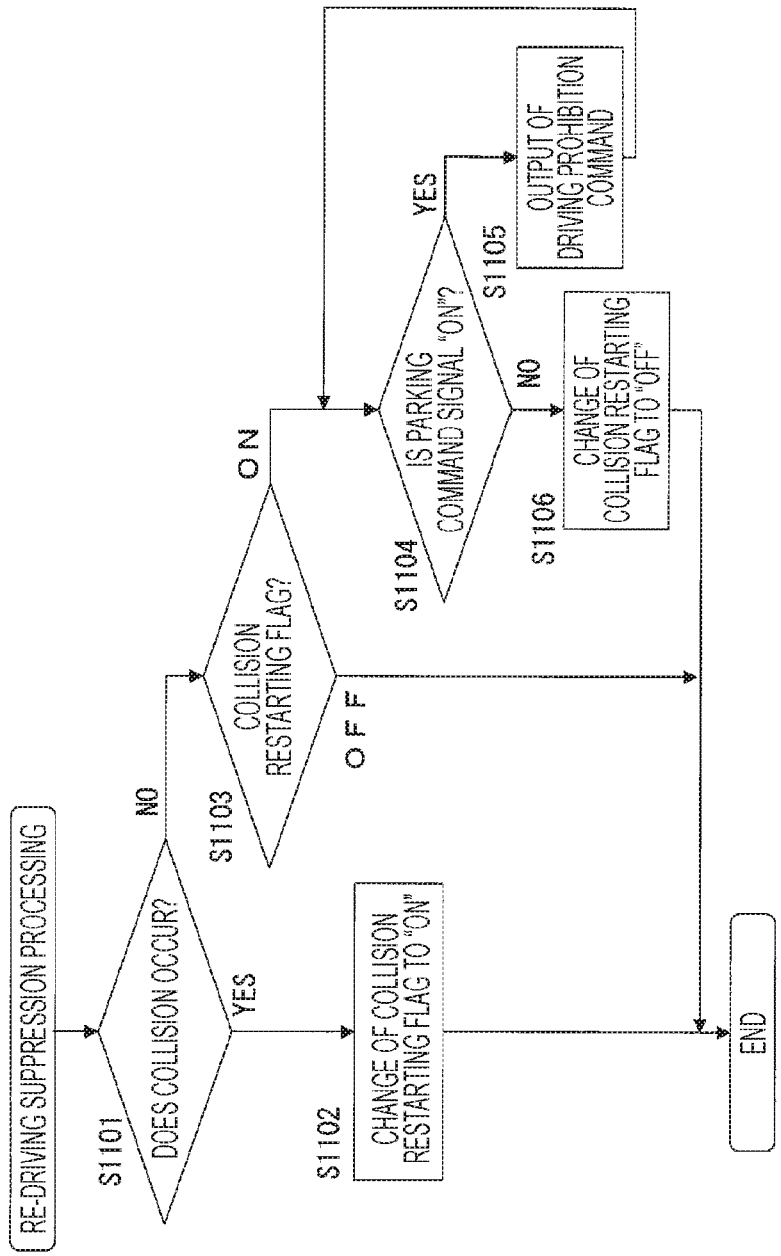
FIG. 24 is a flowchart illustrating re-driving suppression processing according to the fourth embodiment.

FIG. 24 is a flowchart illustrating the re-driving suppression processing. An execution subject of respective steps to be described below is the CPU of the vehicle control device 100. The re-driving suppression processing is repetitively executed by the CPU of the vehicle control device 100.

In step S1101, it is determined whether or not a determination as collision between the vehicle 800 and a moving body is made by the collision prediction unit 3. In a case where the collision prediction unit 3 makes a determination as collision, it proceeds to step S1102. In a case where the collision prediction unit 3 does not make a determination as collision, it proceeds to step S1103.

In step S1102, the collision restarting flag reserved in the RAM is changed to ON, and execution of the flowchart illustrated in FIG. 24 is terminated.

In step S1103, it is determined whether the collision restarting flag reserved in the RAM is ON or OFF. In a case where it is determined that the collision restarting flag is ON, it proceeds to step S1104. In a case where it is determined that the collision restarting flag is OFF, execution of the flowchart illustrated in FIG. 24 is terminated.

In step S1104, it is determined whether or not a parking command signal is output, that is, whether or not the in-vehicle execution button 102 or the remote controller execution button 112 is pressed, and the interface 9 receives a signal indicating the pressing. In a case where it is determined that the parking command signal is output, it proceeds to step S1105. In a case where it is determined that the parking command signal is not output, it proceeds to step S1106.

In step S1105, a drive prohibition command is output to the drive system control unit 4, and it returns to step S1104.

In step S1106, the collision restarting flag reserved in the RAM is changed to OFF, and execution of the flowchart illustrated in FIG. 24 is terminated.

(Explanation of Operation)

When the collision prediction unit 3 makes a determination as collision, the collision restarting flag is changed to ON (step S1102). Then, when the collision prediction unit 3 makes a determination as non-collision due to movement of an obstacle, and the in-vehicle execution button 102 or the remote controller execution button 112 is pressed, a drive prohibition command is output (S1101: NO, S1103: ON, S1104: YES, S1105). Then, if the in-vehicle execution button 102 or the remote controller execution button 112 is continuously pressed, a loop of steps S1104 and S1105 continues, and output of the drive prohibition command continues.

Then, if the in-vehicle execution button 102 or the remote controller execution button 112 is not pressed, the collision restarting flag is changed to OFF (S1101: NO, S1103: ON, S1104: NO, S1106). Next, when the in-vehicle execution button 102 or the remote controller execution button 112 is pressed, since the collision restarting flag is OFF, the drive prohibition command is not output (S1101: NO, S1103: OFF).

According to the fourth embodiment, the vehicle 800 can be driven again after not only the collision prediction unit 3 but also the driver confirm disappearance of a concern related to collision, and thus it is possible to perform more safe automatic parking.

Fifth Embodiment

Description will be given of a fifth embodiment of the vehicle control device according to the invention. In the following description, the same reference numeral will be given to the same constituent element as in the first embodiment, and description will be mainly given to a point of difference. A configuration that is not particularly described is the same as in the first embodiment. This embodiment is different from the first embodiment in that a remote controller transmits a heartbeat signal for every predetermined time interval, and in a case where the heartbeat signal cannot be received even when the in-vehicle execution button is pressed, the vehicle control device does not drive parking.

(Configuration)

This embodiment is different from the above-described configuration mainly in the operation of the remote controller 111 and an operation in the automatic parking mode of the vehicle control device 100.

The remote controller 111 has a so-called keep-alive function, and transmits a heartbeat signal for every predetermined time interval regardless of pressing of the remote controller execution button 112 by a driver. The vehicle control device 100 grasps that the remote controller 111 is in a communication-possible state through reception of the heartbeat signal.

The vehicle control device 100 changes processing in the automatic parking mode, that is, the processing in step S505 of FIG. 6.

Figure 25:
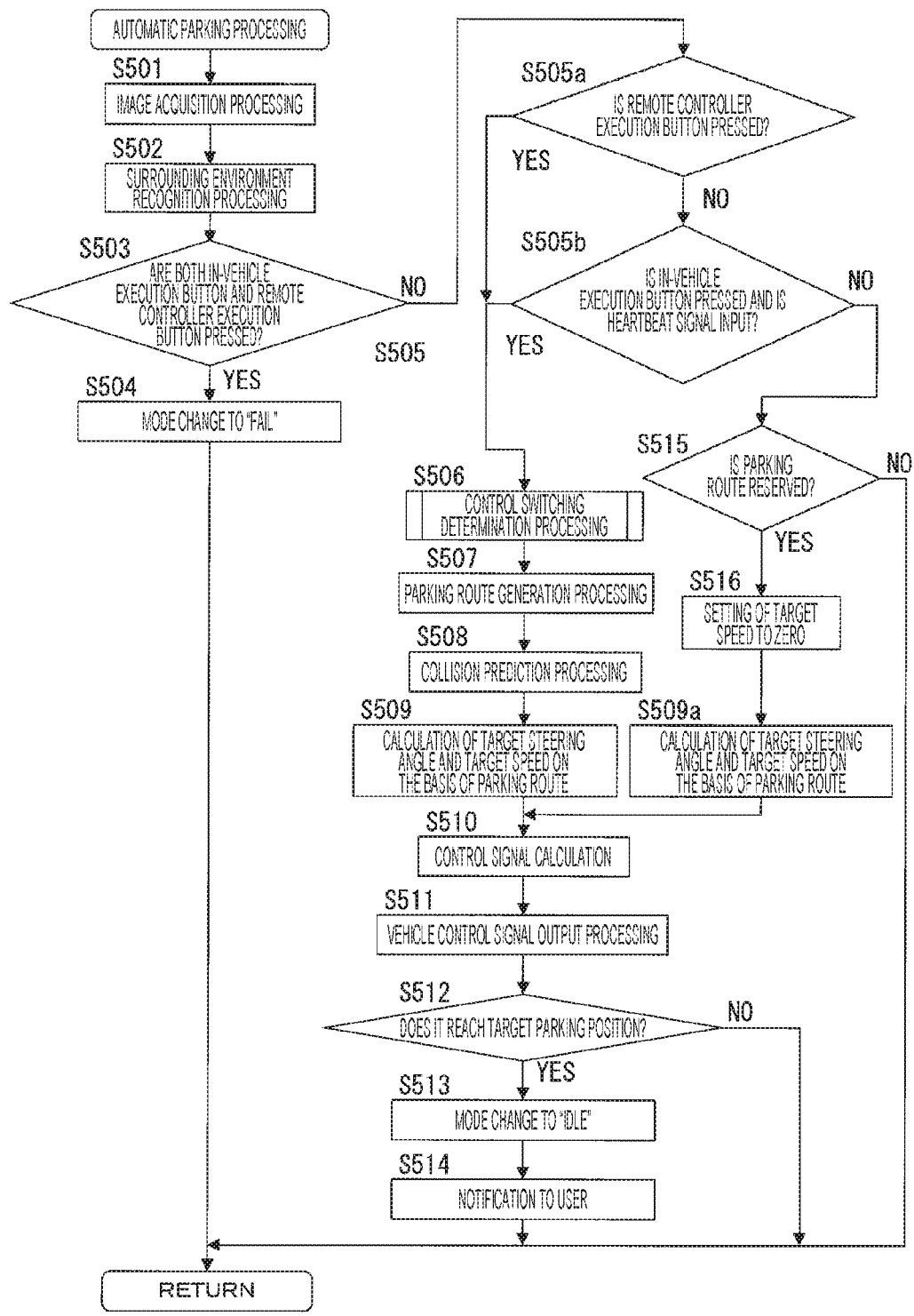
FIG. 25 is a flowchart illustrating a part of automatic parking processing according to a fifth embodiment.

FIG. 25 is a flowchart illustrating a part of automatic parking processing in the fifth embodiment. In FIG. 25, step S505 of FIG. 6 in the first embodiment is substituted with step S505*a* and step S505*b*. In the following description, description will be given of a portion that is changed from the first embodiment.

Step S505*a* is executed when determination is made as NO in step S503.

In step S505*a*, the vehicle control device 100 determines whether or not the remote controller execution button 112 is pressed. In a case where determination is made as pressing, it proceeds to step S506. In a case where determination is made as not-pressing, it proceeds to step S505b.

In step S505b, the vehicle control device 100 determines whether or not it enters a state in which the in-vehicle execution button 102 is pressed and the heartbeat signal is input. In a case where it is determined that the in-vehicle execution button 102 is pressed and the heartbeat signal is input, it proceeds to step S506. In a case where it is determined that the in-vehicle execution button 102 is not pressed or the heartbeat signal is not input, it proceeds to step S515.

Processing subsequent to step S506 and processing subsequent to step S515 are the same as in the first embodiment.

According to the fifth embodiment, the following operational effect is obtained.

(1) The second parking command signal, that is, a signal indicating that the remote controller execution button 112 is pressed is input to a signal input unit, that is, the interface 9 through a wireless communication. A heartbeat signal, which indicates that the wireless communication is normally performed, is input to the signal input unit, that is, the interface 9. Even when the first parking command signal, that is, a signal, which indicates that the in-vehicle execution button 102 is pressed, is continuously input, a travel control unit, that is, the drive system control unit 4 does not drive the vehicle 800 in a case where the heartbeat signal is not input.

Since the remote controller 111 has the keep-alive function, the vehicle control device 100 can detect occurrence of any problem in the wireless communication. That is, it is possible to detect that even though the remote controller execution button 112 may be pressed, it enters a state in which reception is impossible. Accordingly, it is possible to realize a control of the vehicle 800 in which possibility of pressing of the remote controller execution button 112 is taken into consideration.

Modification Example of Fifth Embodiment

In the above-described fifth embodiment, the remote controller 111 always outputs the heartbeat signal. However, when outputting a signal indicating pressing of the remote controller execution button 112, the remote controller 111 may not output the heartbeat signal.

The above-described embodiments and modification examples may be combined with each other.

As described above, description has been given of various embodiments and modification examples, but the invention is not limited to the contents thereof. Other aspects, which can be considered in a range of the technical spirit of the invention, are also included in the range of the invention. Various aspects can be executed in a range not departing from the gist of the invention.

Priority is claimed on Japanese Patent Application No. 2015-66363, filed Mar. 27, 2015, the content of which is incorporated herein by reference.

REFERENCE SIGNS LIST 1 surrounding environment recognition unit
2 parking route generation unit
3 collision prediction unit
4 drive system control unit
5 control switching determination unit
7 in-vehicle environment recognition unit
9a interface
9b interface
9c interface
100 vehicle control device
102 in-vehicle execution button
103 search initiation button
111 remote controller
112 remote controller execution button
800 vehicle

The invention claimed is:

1. A vehicle control device, comprising:
a central processing unit (CPU) programmed to:
  recognize a surrounding environment of a vehicle;
  generate a travel route to a single parking position determined based on the surrounding environment that is recognized;
  allow the vehicle to travel to the single parking position along the travel route based on a parking command signal; and
  determine from where the parking command signal is inputted to the vehicle control device;
a signal interface to which the parking command signal is input;
a communication device that performs a wireless communication with a remote controller disposed outside of the vehicle; and
an operation member that is provided at a position capable of being operated by a driver of the vehicle inside of the vehicle,
wherein the CPU is programmed to determine whether the parking command signal input to the signal interface is a first parking command signal input via the communication device or a second parking command signal input via the operation member,
wherein the CPU is programmed to control the vehicle to be driven to perform automatic parking travel to the single parking position in a behavior different between a situation in which the parking command signal input to the signal interface is the first parking command signal input via the communication device and a situation in which the parking command signal input to the signal interface is the second parking command signal input via the operation member,
wherein the CPU is programmed to set all of a steering speed to be higher, a vehicle speed to be higher, an acceleration to be larger, and a stop time at a time of direction switching to be shorter in a first case where the first parking command signal is input via the communication device than in a second case where the second parking command signal is input via the operation member to control the behavior of the vehicle so that the time necessary for parking completion is controlled to be shorter in the first case than in the second case, and
wherein, in generating the travel route, the CPU is programmed to determine whether the surrounding environment includes an obstacle adjacent to the single parking position, and to lengthen a distance from the obstacle in the first case as compared to the second case, such that the CPU sets an obstacle shortest distance parameter of the travel route at a greater value when the first parking command signal is input via the communication device from outside of the vehicle than when the second parking command signal is input via the operation member inside of the vehicle.

2. The vehicle control device according to claim 1, wherein when the parking command signal is input to the signal interface, the CPU controls the vehicle to perform automatic parking travel, and when the parking command signal is not input to the signal interface, the CPU stops the automatic parking travel.

3. The vehicle control device according to claim 1, further comprising:
an in-vehicle output unit that is provided inside the vehicle and outputs the second parking command signal to the signal interface; and
an outside-of-vehicle output unit that outputs the first parking command signal to the signal interface from the outside of the vehicle.

4. The vehicle control device according to claim 1,
wherein the CPU is programmed to recognize the surrounding environment by receiving an image capturing signal from at least two image capturing units which are fixed to the vehicle and photograph two left and right directions of the vehicle, and
when the first parking command signal is input, the CPU generates a travel route including a route in which the at least two image capturing units go straight on a lateral side of the single parking position while photographing the single parking position.

5. The vehicle control device according to claim 1,
wherein the parking command signal is input to the signal interface through a wireless communication,
a heartbeat signal, which indicates that the wireless communication is normally performed, is input to the signal interface, and
in a case where the heartbeat signal is not input, the vehicle control device does not drive the vehicle.

6. A vehicle control device, comprising:
a central processing unit (CPU) programmed to:
recognize a surrounding environment of a vehicle;
generate a travel route to a single parking position determined based on the surrounding environment that is recognized;
allow the vehicle to travel to the single parking position along the travel route based on a parking command signal; and
determine from where the parking command signal is inputted to the vehicle control device;
a signal interface to which the parking command signal is input;
a communication device that performs a wireless communication with a remote controller disposed outside of the vehicle that includes a first execution button; and
an operation member, including a second execution button, that is provided at a position capable of being operated by a driver of the vehicle inside of the vehicle,
wherein the CPU is programmed to determine whether the parking command signal input to the signal interface is a first parking command signal input via the communication device or a second parking command signal input via the operation member,
wherein the CPU is programmed to control the vehicle to be driven to perform automatic parking travel to the single parking position in a behavior different between a situation in which the parking command signal input to the signal interface is the first parking command signal input via the communication device and a situation in which the parking command signal input to the signal interface is the second parking command signal input via the operation member,
wherein the CPU is programmed to set all of a steering speed to be higher, a vehicle speed to be higher, an acceleration to be larger, and a stop time at a time of direction switching to be shorter in a first case where the first parking command signal is input via the communication device than in a second case where the second parking command signal is input via the operation member to control the behavior of the vehicle so that the time necessary for parking completion is controlled to be shorter in the first case than in the second case,
wherein the CPU is programmed to end the automatic parking travel and stop the vehicle based on receiving a signal indicating that the first execution button or the second execution button has been released, and
wherein, in generating the travel route, the CPU is programmed to determine whether the surrounding environment includes an obstacle adjacent to the single parking position, and to lengthen a distance from the obstacle in the first case as compared to the second case, such that the CPU sets an obstacle shortest distance parameter of the travel route at a greater value when the first parking command signal is input via the communication device from outside of the vehicle than when the second parking command signal is input via the operation member inside of the vehicle.

7. The vehicle control device according to claim 1, further comprising:
an environmental information acquisition device including a plurality of in-vehicle cameras configured to photograph surrounding environments on a forward side, a backward side, a rightward side, and a leftward side of the vehicle;
wherein each of the in-vehicle cameras is configured to have a higher spatial resolution toward a center of an angle of view than away from the center, such that a high-resolution image of a photographing target without distortion is acquired by using a first in-vehicle camera that photographs the rightward side or the leftward side and an optical axial direction of the first in-vehicle camera matches a forward/backward movement direction of the vehicle that is parked at the single parking position.

8. The vehicle control device according to claim 6, further comprising:
an environmental information acquisition device including a plurality of in-vehicle cameras configured to photograph surrounding environments on a forward side, a backward side, a rightward side, and a leftward side of the vehicle;
wherein each of the in-vehicle cameras is configured to have a higher spatial resolution toward a center of an angle of view than away from the center, such that a high-resolution image of a photographing target without distortion is acquired by using a first in-vehicle camera that photographs the rightward side or the leftward side and an optical axial direction of the first in-vehicle camera matches a forward/backward movement direction of the vehicle that is parked at the single parking position.

* * * * *